United States Patent
Umeda et al.

(10) Patent No.: US 8,311,155 B2
(45) Date of Patent: Nov. 13, 2012

(54) ELECTRONIC TUNER AND HIGH FREQUENCY RECEIVING DEVICE USING THE SAME

(75) Inventors: Takashi Umeda, Osaka (JP); Hiroaki Ozeki, Osaka (JP); Akira Fujishima, Aichi (JP)

(73) Assignee: Panasonic Corporation, Osaka (JP)

( * ) Notice: Subject to any disclaimer, the term of this patent is extended or adjusted under 35 U.S.C. 154(b) by 275 days.

(21) Appl. No.: 12/808,461

(22) PCT Filed: Dec. 24, 2008

(86) PCT No.: PCT/JP2008/003910
§ 371 (c)(1),
(2), (4) Date: Jun. 16, 2010

(87) PCT Pub. No.: WO2009/081575
PCT Pub. Date: Feb. 7, 2009

(65) Prior Publication Data
US 2011/0122975 A1    May 26, 2011

(30) Foreign Application Priority Data

Dec. 26, 2007 (JP) ................................. 2007-333776
Dec. 26, 2007 (JP) ................................. 2007-333777
Jan. 11, 2008 (JP) ................................. 2008-003989

(51) Int. Cl.
*H04L 25/06* (2006.01)

(52) U.S. Cl. ........ 375/319; 375/316; 375/324; 375/340; 455/263; 455/285; 455/295; 455/296; 455/302

(58) Field of Classification Search .................. 375/316, 375/319, 324, 340; 455/263, 285, 295, 296, 455/302
See application file for complete search history.

(56) References Cited

U.S. PATENT DOCUMENTS

2006/0073803 A1    4/2006  Igarashi et al.
2007/0060094 A1*   3/2007  Umeda et al. ............... 455/302

FOREIGN PATENT DOCUMENTS

JP    2003-134183 A    5/2003
JP    2006-108844 A    4/2006

OTHER PUBLICATIONS

International Search Report for PCT/JP2008/003910.

* cited by examiner

*Primary Examiner* — Leon Flores
(74) *Attorney, Agent, or Firm* — Pearne & Gordon LLP

(57) ABSTRACT

Demodulator includes reception quality evaluation circuit for evaluating the quality of a received signal by comparison with a first reference value, and outputting an evaluation signal; and driving circuit receiving the evaluation signal. If reception quality evaluation circuit evaluates that the quality of the received signal is acceptable, power supply from driving circuit to DC offset control loop is stopped. This offers a high-frequency receiver that reduces power consumption.

26 Claims, 16 Drawing Sheets

US 8,311,155 B2

ELECTRONIC TUNER AND HIGH FREQUENCY RECEIVING DEVICE USING THE SAME

THIS APPLICATION IS A U.S. NATIONAL PHASE APPLICATION OF PCT INTERNATIONAL APPLICATION PCT/JP2008/003910.

TECHNICAL FIELD

The present invention relates to high-frequency receivers employing a direct conversion system electronic tuner used typically for battery-driven mobile televisions.

BACKGROUND ART

A conventional high-frequency receiver is described below with reference to drawings.

FIG. 17 is a circuit block diagram of conventional high-frequency receiver 1. In FIG. 17, conventional high-frequency receiver 1 includes input terminal 3 connected to an antenna, electronic tuner 5 for selecting a desired channel from received signals input from this input terminal 3, and demodulator 7 for demodulating I and Q signals output from this electronic tuner 5.

This electronic tuner 5 includes filter 13 passing the received signals from input terminal 3, amplifier 15 receiving an output of this filter 13, mixers 17 and 25 receiving an output of this amplifier through their one inputs, oscillator 33 connected to the other inputs of mixers 17 and 25 via phase shifter 35, compositors 19 and 27 receiving outputs of these mixers 17 and 25 through their one inputs, low-pass filters 21 and 29 receiving outputs of these compositors 19 and 27, respectively; amplifiers 23 and 31 receiving outputs of these low-pass filters 21 and 29, respectively; output terminals 9 and 11 receiving outputs of these amplifiers 23 and 31; DC offset detecting circuit 45 for detecting DC offset voltage, DC offset correcting circuit 47 connected to an output of this DC offset detecting circuit 45 for correcting the DC offset voltage, and DC offset evaluation circuit 46 connected between DC offset detecting circuit 45 and DC offset correcting circuit 47 for evaluating the DC offset voltage.

The first and second cancel signals output from DC offset correcting circuit 47 are supplied to the other inputs of compositors 19 and 27, respectively.

Demodulator 7 includes AD converters 37 and 39 connected to output terminals 9 and 11, respectively; demodulating circuit 41 connected to outputs of these AD converters 37 and 39, respectively; and output terminal 43 receiving a demodulated signal from this demodulating circuit 41. Outputs of A/D converters 37 and 39 are input to offset detecting circuit 45, respectively.

The operation of high-frequency receiver 1 as configured above is described below. Mixing circuit 49 is a direct conversion type mixing circuit including mixers 17 and 25, oscillator 30, and 90-degree phase shifter 35. In this mixing circuit 49, mixers 17 and 25 output I and Q signals with 90° different phases to each other.

These I and Q signals are output from output terminals 9 and 11, via low-pass filters 21 and 29, respectively. In addition, these I and Q signals are converted to digital signals by A/D converters 37 and 39. Then, demodulating circuit 41 converts these signals to demodulated signals and they are output from output terminal 43.

In mixing circuit 49 adopting the direct conversion system as described above, the first and second DC offset voltages are generated in mixers 17 and 25. These first and second DC offset voltages generate DC voltage in received signals, degrading the reception quality.

To reduce this DC offset voltage, the DC offset voltage needs to be corrected. For this purpose, the outputs of A/D converters 37 and 39 are input to DC offset detecting circuit 45, and this offset detecting circuit 45 detects and evaluates the DC offset voltage.

Based on an evaluation result, DC offset correcting circuit 47 outputs first and second cancel signals for canceling out the first and second DC offset voltages, and these cancel signals are input to compositors 19 and 27 to cancel out the first and second DC offset voltage. Patent Literature 1 is one prior art related to the present invention.

Low power consumption is particularly given importance in high-frequency receivers employed in battery-driven devices, such as mobile televisions. However, the conventional high-frequency receiver corrects the DC offset voltage in the state continuously supplying power to DC offset correcting circuit 47. This results in large power consumption.

Patent Literature 1: Japanese Patent Unexamined Publication No. 2003-134183

SUMMARY OF THE INVENTION

The present invention offers a high-frequency receiver that consumes less power.

In the high-frequency receiver of the present invention, a demodulator includes a reception quality evaluation circuit for evaluating the quality of received signal by comparison with a first reference value and outputting an evaluation signal, and a driving circuit receiving this evaluation signal. If the reception quality evaluation circuit evaluates that the quality of received signal is acceptable, a power supply to a DC offset control loop is stopped by the driving circuit. This achieves the high-frequency receiver that consumes less power.

In an electronic tuner of the present invention, a demodulator includes a reception quality detecting circuit for detecting the quality of received signal, a first fading detecting circuit for detecting fading frequency due to movement, a reception quality evaluation circuit receiving a reception quality signal from the reception quality detecting circuit and the fading frequency from the first fading detecting circuit, and a driving circuit receiving a reception quality evaluation signal output from this reception quality evaluation circuit and supplying or stopping power to a DC offset control loop. A quality evaluation reference value in the reception quality evaluation circuit is set according to the fading frequency from the first fading detecting circuit. If the reception quality evaluation circuit evaluates that the quality of received signal is acceptable, a power supply to the DC offset control loop is stopped by the driving circuit. This achieves the high-frequency receiver that consumes less power.

Furthermore, an electronic tuner of the present invention includes a driving circuit receiving a first evaluation signal output from a DC offset evaluation circuit. A first driving voltage output from this driving circuit is connected to a DC offset correcting circuit. The driving circuit stops power supply to the DC offset correcting circuit if the DC offset evaluation circuit evaluates that the first and second DC offset voltages are less than a reference value. This achieves the electronic tuner that consumes less power.

REFERENCE MARKS IN THE DRAWINGS

Figure 1:
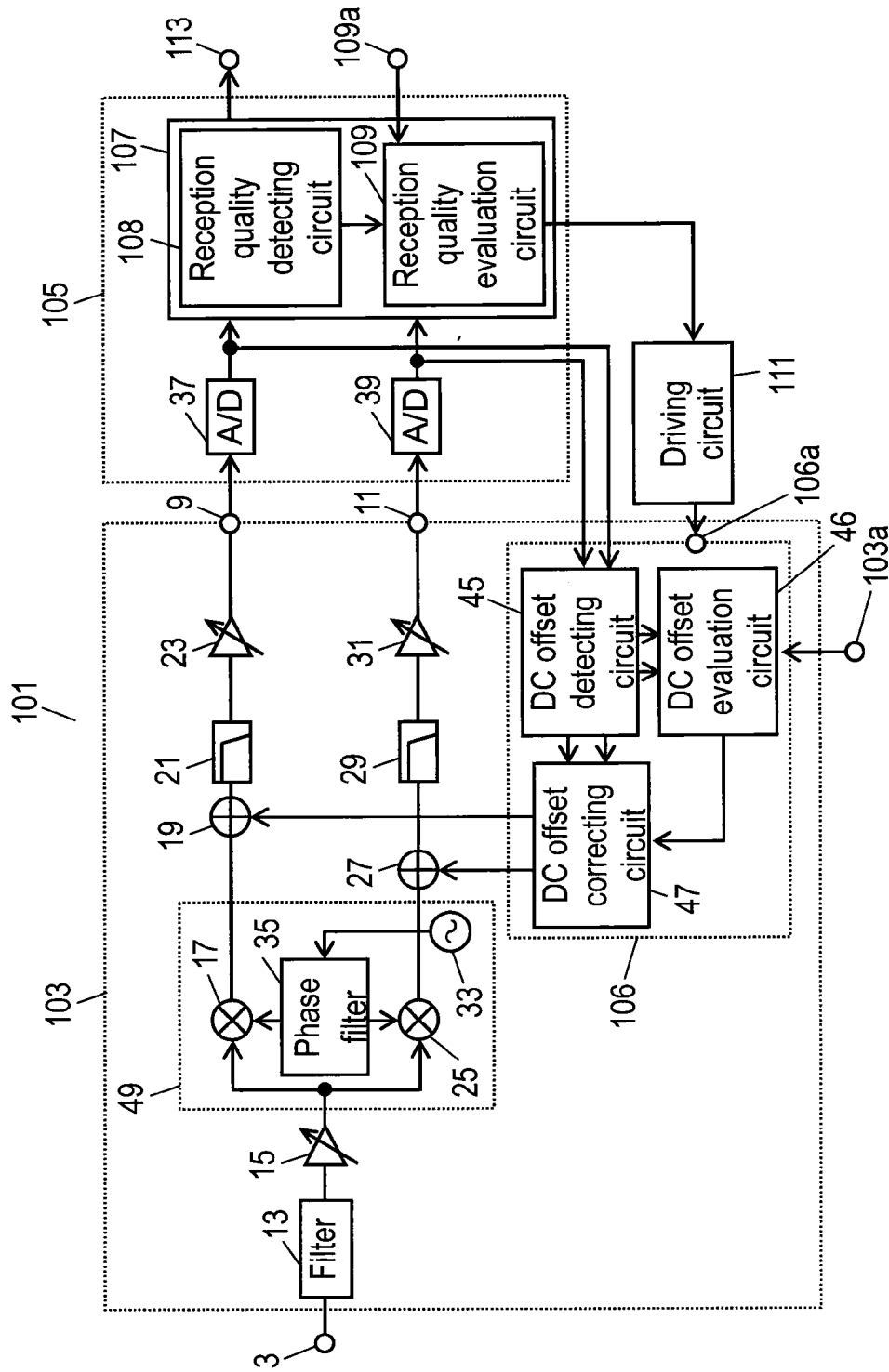
FIG. 1 is a circuit block diagram of a high-frequency receiver in accordance with a first exemplary embodiment of the present invention.

3 Input terminal
9. 43. 113. 213 Output terminal
11 Output terminal
17 Mixer
19 Compositor
25 Mixer
27 Compositor
33 Oscillator
35 Phase shifter
45 DC offset detecting circuit
46 DC offset evaluation circuit
47 DC offset correcting circuit
101, 141, 201, 401, 501 High-frequency receiver
102, 103 Electronic tuner
105, 202, 403 Demodulator
106, 147 DC offset control loop
106a Power input terminal
109, 210 Reception quality evaluation circuit
111, 145 Driving circuit

DETAILED DESCRIPTION OF PREFERRED EMBODIMENTS

First Exemplary Embodiment

A high-frequency receiver in the first exemplary embodiment of the present invention is described below with reference to drawings.

FIG. 1 is a circuit block diagram of the high-frequency receiver in the first exemplary embodiment of the present invention.

Figure 17:
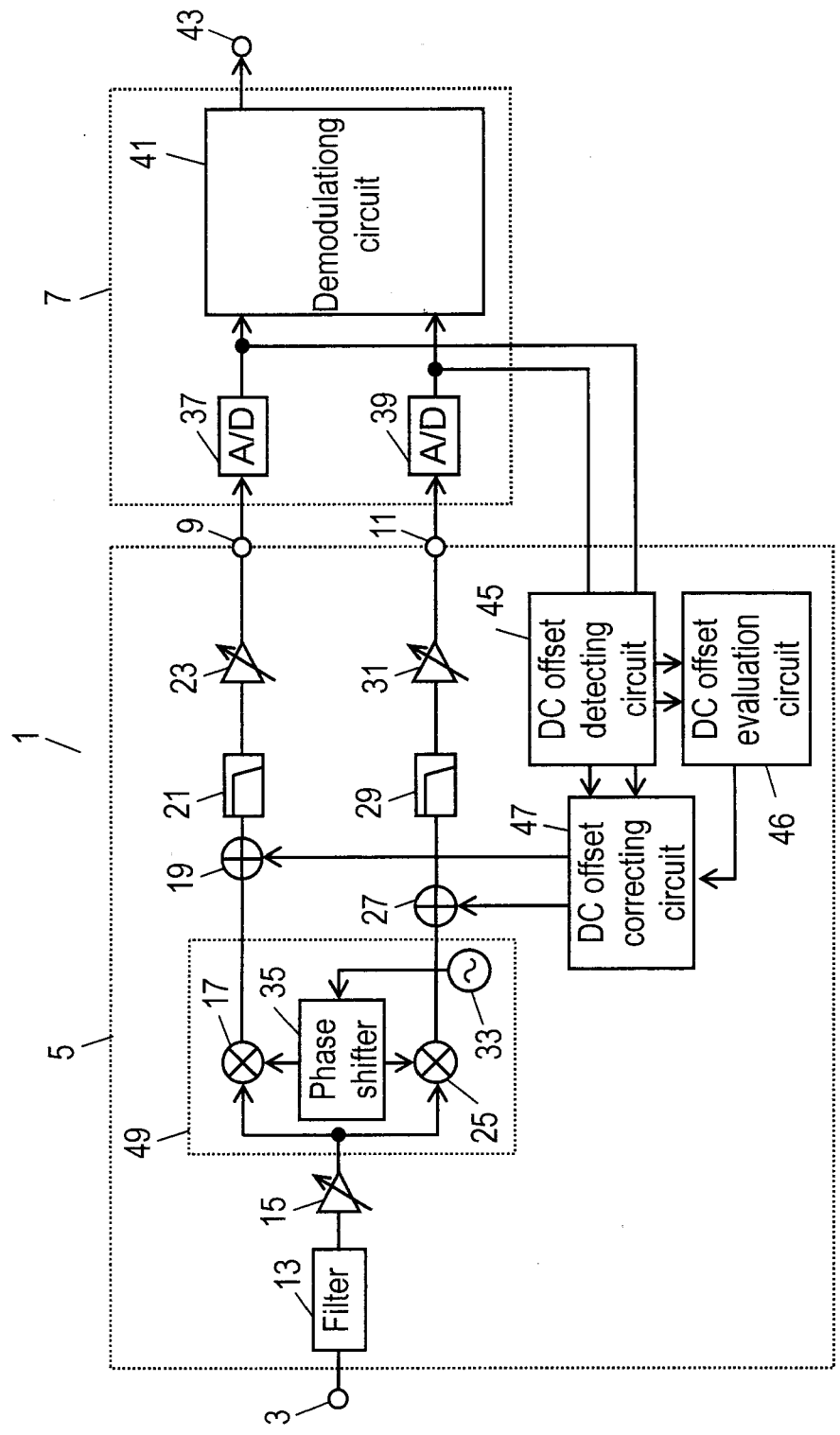
FIG. 17 is a circuit block diagram of a conventional high-frequency receiver.

In FIG. 1, components same as those in the prior art shown in FIG. 17 are given the same reference marks.

High-frequency receiver 101 includes input terminal 3 connected to an antenna, electronic tuner 103 for selecting a desired channel from received signals input from this input terminal 3, and demodulator 105 for demodulating I and Q signals output from this electronic tuner 103.

This electronic tuner 103 includes filter 13 for passing received signals from input terminal 3, amplifier 15 receiving an output of this filter 13, mixers 17 and 25 receiving an output of this amplifier through their one inputs, oscillator 33 connected to the other inputs of these mixers 17 and 25 via phase shifter 35, compositors 19 and 27 receiving outputs of these mixers 17 and 25 through their one inputs, respectively; low pass filters 21 and 29 receiving outputs of these compositors 19 and 27, respectively; amplifiers 23 and 31 receiving outputs of these low pass filters 21 and 29, respectively; output terminals 9 and 11 receiving outputs of these amplifiers 23 and 31, respectively; DC offset detecting circuit 45 for detecting DC offset voltage, DC offset correcting circuit 47 connected to an output of this offset detecting circuit 45 for correcting the DC offset voltage, and DC offset evaluation circuit 46 connected between DC offset detecting circuit 45 and DC offset correcting circuit 47 for evaluating the DC offset voltage.

The first and second cancel signals output from DC offset correcting circuit 47, respectively, are supplied to the other inputs of compositors 19 and 27, respectively. DC offset control loop 106 is configured with DC offset detecting circuit 45, DC offset evaluation circuit 46, and DC offset correcting circuit 47.

Demodulator 105 includes A/D converters 37 and 39 connected to output terminals 9 and 11, respectively; demodulating circuit 107 connected to outputs of these A/D converters 37 and 39, respectively; and output terminal 113 for outputting a demodulated signal from this demodulating circuit 107.

Demodulating circuit 107 includes reception quality detecting circuit 108 for detecting the quality of received signals, and reception quality evaluation circuit 109 receiving a reception quality signal from this reception quality detecting circuit 108 for evaluating the reception quality. External terminal 109a, to which a first reference value can be input, is provided to this reception quality evaluation circuit 109.

A control signal output from reception quality evaluation circuit 109 is connected to driving circuit 111. Driving voltage output from this driving circuit 111 is connected to power input terminal 106a provided in DC offset control loop 106. Outputs of A/D converters 37 and 39 are input to DC offset detecting circuit 45, respectively. Driving circuit 111 may also be built in demodulator 105 or electronic tuner 103.

The operation of high-frequency receiver 101 as configured above is described below. A high-frequency signal input from input terminal 3 is, for example, digitally-modulated digital TV broadcast, and frequencies ranging from about 470 MHz (CH13) to about 770 MHz (CH62) are applicable in UHF.

In electronic tuner 103, filter 13 suppresses a disturbing signal in a high-frequency signal input to input terminal 3. Amplifier 15 applies gain control to an output of this filter 13. An output of this amplifier 15 is fed to mixing circuit 49.

Mixing circuit 49 is configured as a direct conversion system mixer including mixers 17 and 25, oscillator 33, and 90-degree phase shifter 35. Through this mixing circuit 49, the I and Q signals with 90-degree different phases to each other are output from mixers 17 and 25. These I and Q signals are input to low pass filters 21 and 29. Outputs of these low pass filters 21 and 29 are input to amplifiers 23 and 31. These amplifiers 23 and 31 output the I and Q signals via output terminals 9 and 11, respectively.

In demodulator 105, these I and Q signals are input to A/D converters 37 and 39. These A/D converters 37 and 39 output digital signals, respectively. Demodulating circuit 107 converts these signals to demodulated signals, and they are output from output terminal 113.

In mixing circuit 49 adopting the above-described direct conversion system, an oscillation signal of oscillator 33 leaks to one input of mixer 17 or one input of mixer 25. This leaked oscillation signal and an oscillation signal that is properly input from oscillator 33 are self-mixed in mixer 17 or 25. This causes generation of DC offset voltage from mixer 17 or mixer 25.

Alternatively, if a large disturbing signal is input to input terminal 3, this disturbing signal leaks to one input of mixer 17 or one input of mixer 25. This leaked disturbing signal and the oscillation signal that is properly input from oscillator 33 are self-mixed in mixer 17 or 25. This causes generation of DC offset voltage from mixer 17 or mixer 25.

In this way, first and second DC offset voltages are generated from mixers 17 and 25, respectively, degrading the reception quality.

Next, a method of improving these first and second DC offset voltages by DC offset control loop 106 is described.

DC offset control loop 106 includes DC offset detecting circuit 45, DC offset evaluation circuit 46, and DC offset correcting circuit 47. In DC offset detecting circuit 45, the first and second DC offset voltages are detected, respectively, using the I and Q signals output from A/D converters 37 and 39, respectively. This detection signal is input to DC offset evaluation circuit 46.

If the first and second DC offset voltages are less than a second reference value in this DC offset evaluation circuit 46, DC offset correcting circuit 47 does not supply the first and second cancel signals. The same effect is also achievable when the first and second cancel signals are retained in compositors 19 and 27, respectively, instead of supplying the first second cancel signals from DC offset correcting circuit 47.

On the other hand, if the first and second DC offset voltages are greater than the second reference value, DC offset correcting circuit 47 supplies the first and second cancel signals for canceling out the first and second DC offset voltages to compositors 19 and 27, respectively. This second reference value can be input from external terminal 103a.

Compositors 19 and 27 combine the first and second DC offset voltages and the first and second cancel signals, respectively, so as to suppress the first and second DC offset voltages.

Memory 115 (not illustrated) can be provided to DC offset evaluation circuit 46. This memory 115 stores the reference value. DC offset evaluation circuit 46 can thus compare the detected first and second DC offset voltages with the reference value stored in memory 115.

Next, a method of supplying or stopping power to DC offset control loop 106 by driving circuit 111 is described.

Figure 2:
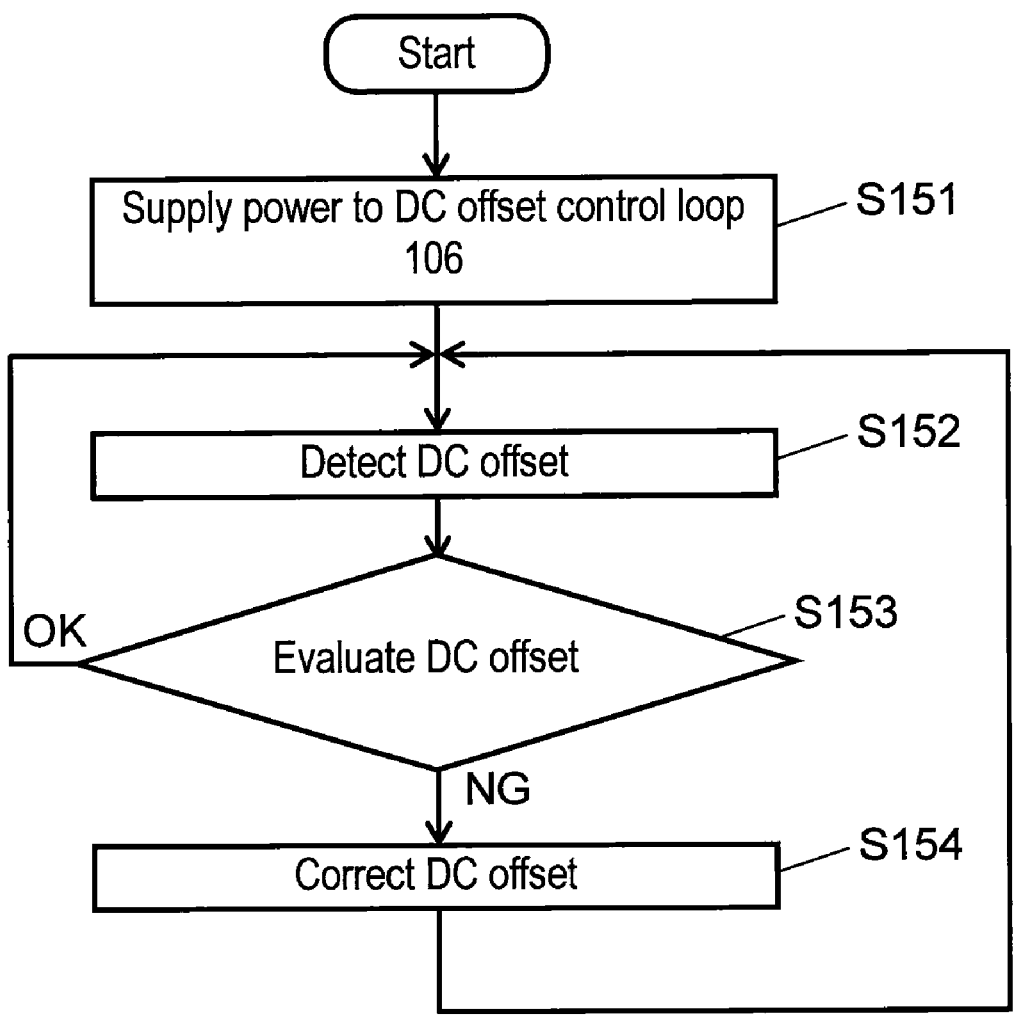
FIG. 2 is a flow chart illustrating a general DC offset voltage correction method for a high-frequency receiver.

FIG. 2 is a flow chart illustrating a general method of correcting DC offset voltage for a high-frequency receiver. In FIG. 2, power from driving circuit 111 is supplied to DC offset control loop 106 via power input terminal 106a at starting signal reception in reception step S151. Then, moving onto reception step S152, DC offset detecting circuit 45 detects the first and second DC offset voltages. Further moving onto reception step S153, DC offset evaluation circuit 46 evaluates the first and second DC offset voltages by comparison with the second reference value.

Based on this detection result, the operation moves onto reception step S154 if the first and second DC offset voltages are greater than the second reference value (Not Acceptable). DC offset correcting circuit 47 supplies the first and second cancel signals to first and second compositors 19 and 27 to correct the DC offset, and the operation further moves onto reception step S152.

On the other hand, if the first and second DC offset voltages are less than the second reference value (OK), the operation returns to reception step S152 without making DC offset correction.

Compared to this general correction method, the next is described a method of correcting the first and second DC offset voltages in the first exemplary embodiment of the present invention.

Figure 3:
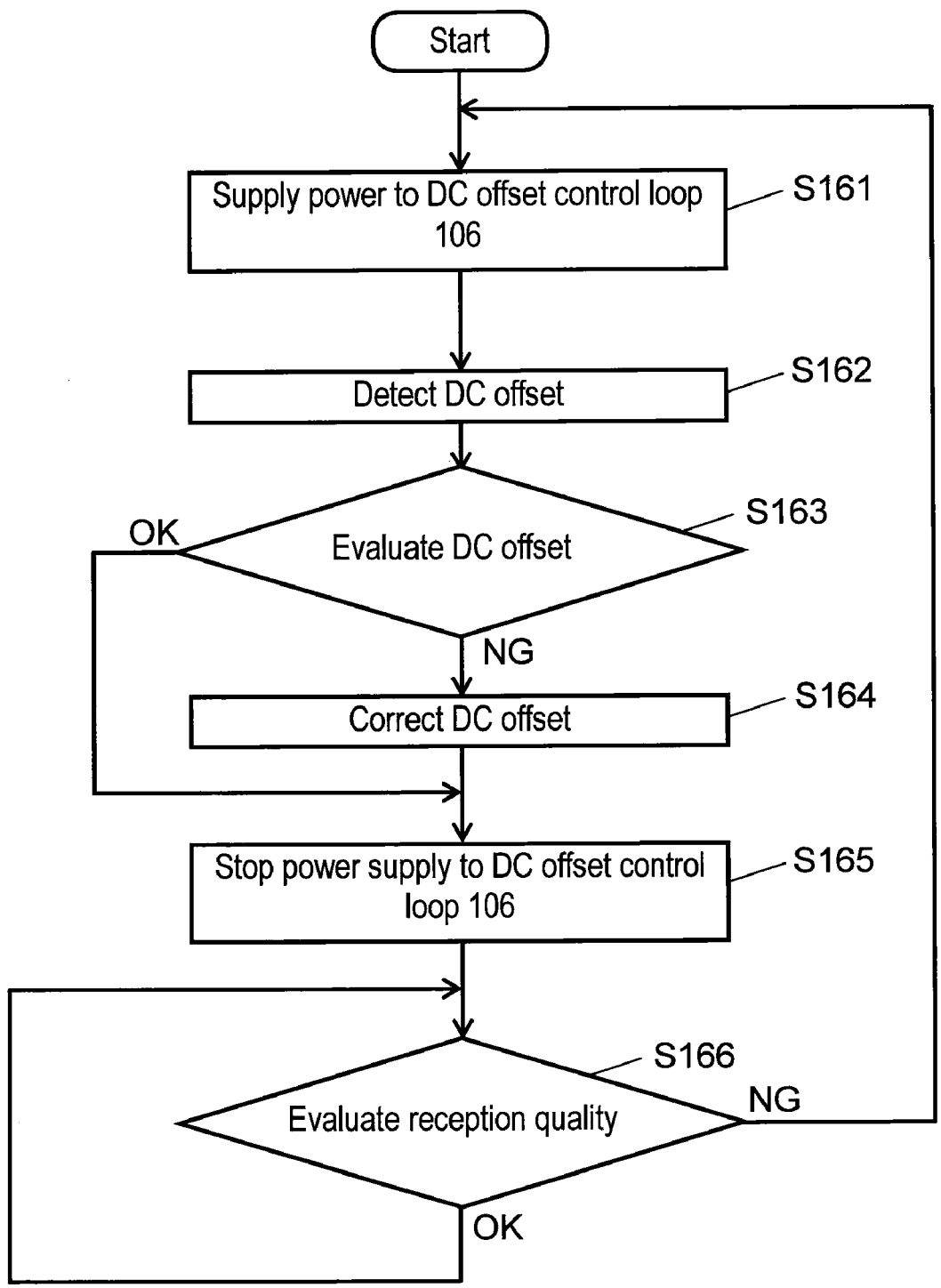
FIG. 3 is a flow chart illustrating a DC offset voltage correction method for the high-frequency receiver in the first exemplary embodiment of the present invention.

FIG. 3 is a flow chart illustrating a method of correcting the first and second DC offset voltages for the high-frequency receiver in the first exemplary embodiment of the present invention. In FIG. 3, power is supplied to DC offset control loop 106 in reception step S161 at starting signal reception. Then, moving onto reception step S162, DC offset detecting circuit 45 detects the first and second DC offset voltages. Then, moving onto reception step S163, DC offset evaluation circuit 46 evaluates the first and second DC offset voltages by comparison with the second reference value.

Based on this detection result, if the first and second DC offset voltages are greater than the second reference value (Not Acceptable), the operation moves onto reception step S164, and DC offset correcting circuit 47 executes DC offset correction. On the other hand, if the first and second DC offset voltages are less than the second reference value (OK), DC offset correction is not executed, and the operation moves onto reception step S165. In this reception step 165, power supply from driving circuit 111 to DC offset control loop 106 is stopped.

Then, the operation moves onto step S166. Reception quality evaluation circuit 109 evaluates the reception quality signal by comparison with the first reference value. If this reception quality signal is less than the first reference value, i.e., if the reception quality is acceptable (OK), the operation returns to reception step S166 for evaluating the reception quality. On the other hand, if the reception quality signal is greater than the first reference value, i.e., the reception quality is poor (Not Acceptable), the operation returns to reception step S161 to repeat on and after reception step S162.

As the reception quality signal, for example, C/N, bit error rate (BER), and packet error rate (PER) can be used. The reception quality is detectable in a shorter time by the use of C/N, BER, and PER, in that order, which means C/N enables the fastest detection of the reception quality. The reception quality is detectable in a longer time by the use of PER, BER, and C/N in that order, which means PER requires the longest time for detecting the reception quality. However, PER has the best accuracy for detecting the reception quality. Therefore, for example, for stopping power supply to DC offset control loop 106, PER that has the higher accuracy can be used for evaluating the reception quality. On the other hand, for supplying power and operating DC offset control loop 106, BER or C/N can be used to give priority to time spent for detecting the reception quality.

To supply power and operate DC offset control loop 106, it is necessary to secure sufficient reception quality. For example, if C/N is used, the detection accuracy is low but the reception quality is detectable in a short time. If PER is used, a longer time is required until detection, but its accuracy is high. Accordingly, if the reception quality of at least one of three PER, BER, and C/N is detected in reception quality detecting circuit 108, power is supplied to operate DC offset control loop 106. This minimizes degradation in the reception quality by delay in the operation of DC offset correction.

Power supply or shutoff to DC offset control loop 106 is thus accurately and optimally controlled, realizing high-frequency receiver 101 with low power consumption.

As described above, for receiving a desired channel by high-frequency receiver 101, power supply from driving circuit 111 to DC offset control loop 106 can be stopped when reception quality evaluation circuit 109 evaluates that the reception quality is acceptable. This enables shutoff of power supply to DC offset control loop 106, thus realizing the high-frequency receiver with low power consumption.

If the reception quality signal is better than the first reference value, power supply from driving circuit 111 to DC offset control loop 106 is stopped. However, in this instance, power supply may be stopped to at least one of DC offset detecting circuit 45, DC offset evaluation circuit 46, and DC offset correcting circuit 47.

In the first exemplary embodiment, compositor 19 is inserted between mixer 17 and low pass filter 21, and compositor 27 is inserted between mixer 25 and low pass filter 29. However, this compositor 19 may be inserted between low pass filter 21 and output terminal 9, and compositor 27 may be inserted between low pass filter 29 and output terminal 11.

Moreover, for receiving ISDB-T digital television broadcast, 12 segments or 1 segment out of 13 segments, for example, can be received. During this 1-segment reception, correction of DC offset voltage is needed, as described in the first exemplary embodiment. Contrarily, during 12-segment reception, 1 segment exists at the center position, and this 1 segment is not necessary. Therefore, an allowable value of DC offset voltage can be eased.

In other words, to ease allowance, the second reference value for 12-segment reception can be made greater than the second reference value for 1-segment reception in DC offset evaluation circuit 46. Alternatively, power supply can be stopped to at least one of DC offset detecting circuit 45, DC offset evaluation circuit 46, and DC offset correcting circuit 47 during 12-segment reception.

Furthermore, for 1-segment reception, the oscillation frequency of oscillator 33 is set not less than ½ (about 214 KHz) of 1-segment bandwidth (about 428.5 KHz) away from the center frequency of 1 segment. This enables transformation of intermediate frequency signal of 1 segment at not less than ½ of 1-segment bandwidth (about 214 KHz) away from a DC component by using mixing circuit 49 for heterodyne reception. In this case, a problem of DC offset does not occur.

Accordingly, power supply to DC offset control loop 106 can be stopped in case of 1-segment reception by mixing circuit 49. In this instance, power supply may be stopped to at least one of DC offset detecting circuit 45, DC offset evaluation circuit 46, and DC offset correcting circuit 47 that configures DC offset control loop 106.

To receive 1-segment and 12-segment transmissions separately, they are received as described above. To receive 13-segment transmission at once, power supply from driving circuit 111 to DC offset correcting circuit 47 can be controlled to shut off if the first and second DC offset voltages are less than the second reference value.

Second Exemplary Embodiment

Next, a high-frequency receiver in the second exemplary embodiment of the present invention is described with reference to drawings.

Figure 4:
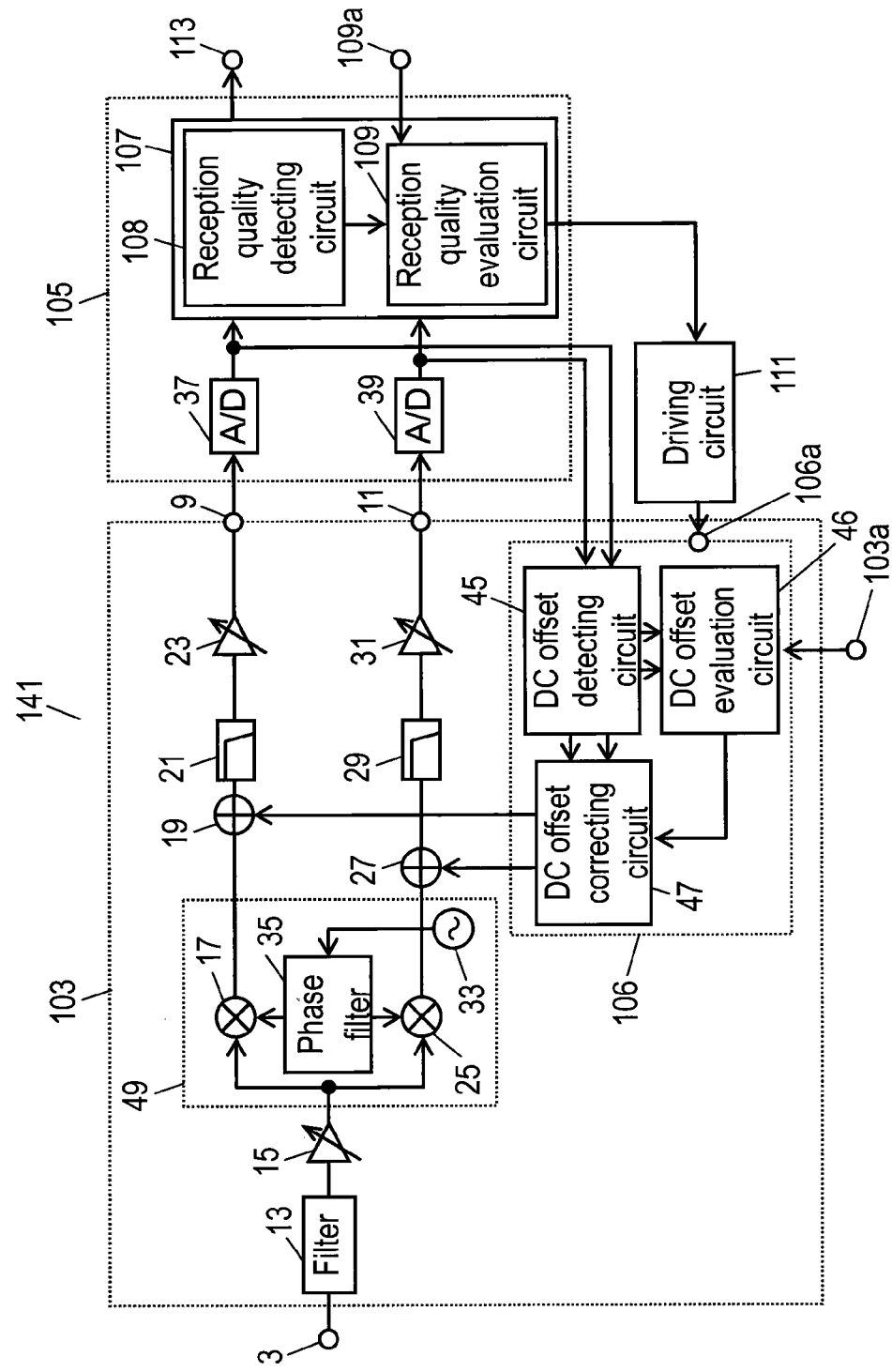
FIG. 4 is a circuit diagram of a high-frequency receiver in accordance with a second exemplary embodiment of the present invention.

FIG. 4 is a circuit block diagram of high-frequency receiver 141 in the second exemplary embodiment. In FIG. 4, a circuit block configuration of high-frequency receiver 141 is basically the same as that of high-frequency receiver 101 in the first exemplary embodiment. A difference between high-frequency receiver 141 in the second exemplary embodiment and high-frequency receiver 101 in the first exemplary embodiment is a method of correcting the first and second DC offset voltages. This is described below.

High-frequency receiver 141 includes input terminal 3 connected to an antenna, electronic tuner 103 for selecting a desired channel from received signals input from this input terminal 3, and demodulator 105 for demodulating I and Q signals output from this electronic tuner 103.

This electronic tuner 103 includes filter 13 for passing received signals from input terminal 3, amplifier 15 receiving an output of this filter 13, mixers 17 and 25 receiving an output of this amplifier through their one inputs, oscillator 33 connected to the other inputs of these mixers 17 and 25 via phase shifter 35, compositors 19 and 27 receiving outputs of these mixers 17 and 25 through their one inputs, respectively; low pass filters 21 and 29 receiving outputs of these compositors 19 and 27, respectively; amplifiers 23 and 31 receiving outputs of these low pass filters 21 and 29, respectively; output terminals 9 and 11 receiving outputs of these amplifiers 23 and 31, respectively; DC offset detecting circuit 45 for detecting DC offset voltage, DC offset correcting circuit 47 connected to an output of this offset detecting circuit 45 for correcting the DC offset voltage, and DC offset evaluation circuit 46 connected between DC offset detecting circuit 45 and DC offset correcting circuit 47 for evaluating the DC offset voltage.

The first and second cancel signals output from DC offset correcting circuit 47, respectively, are supplied to the other inputs of compositors 19 and 27, respectively. DC offset control loop 106 is configured with DC offset detecting circuit 45, DC offset evaluation circuit 46, and DC offset correcting circuit 47.

Demodulator 105 includes A/D converters 37 and 39 connected to output terminals 9 and 11, respectively; demodulating circuit 107 connected to outputs of these A/D converters 37 and 39, respectively; and output terminal 113 for outputting a demodulated signal from this demodulating circuit 107.

Demodulating circuit 107 includes reception quality detecting circuit 108 for detecting the quality of received signals, and reception quality evaluation circuit 109 receiving a reception quality signal from this reception quality detecting circuit 108 for evaluating the reception quality. External terminal 109a, to which a quality evaluation reference value can be input, is provided to this reception quality evaluation circuit 109.

A control signal output from reception quality evaluation circuit 109 is connected to driving circuit 111. Driving voltage output from this driving circuit 111 is connected to power input terminal 106a provided in DC offset control loop 106.

Outputs of A/D converters 37 and 39 are input to DC offset detecting circuit 45, respectively. Driving circuit 111 may also be built in demodulator 105 or electronic tuner 103.

In high-frequency receiver 141 as configured above, reception quality evaluation circuit 109 evaluates the quality of received signals. Power supply to DC offset control loop 106 is controlled based on an evaluation signal on the reception quality. This operation is described below.

The operation of high-frequency receiver 141 as configured above is described below. A high-frequency signal input from input terminal 3 is, for example, digitally-modulated digital TV broadcast, and frequencies ranging from about 470 MHz (CH13) to about 770 MHz (CH62) are applicable in UHF.

In electronic tuner 103, filter 13 suppresses a disturbing signal in a high-frequency signal input to input terminal 3. Amplifier 15 applies gain control to an output of this filter 13. An output of this amplifier 15 is fed to mixing circuit 49.

Mixing circuit 49 is configured as a direct conversion system mixer including mixers 17 and 25, oscillator 33, and 90-degree phase shifter 35. Through this mixing circuit 49, the I and Q signals with 90-degree different phases to each other are output from mixers 17 and 25. These I and Q signals are input to low pass filters 21 and 29. Outputs of these low pass filters 21 and 29 are input to amplifiers 23 and 31. These amplifiers 23 and 31 output the I and Q signals via output terminals 9 and 11, respectively.

In demodulator 105, these I and Q signals are input to A/D converters 37 and 39. These A/D converters 37 and 39 output digital signals, respectively. Demodulating circuit 107 converts these signals to demodulated signals, and they are output from output terminal 113.

In mixing circuit 49 adopting the above-described direct conversion system, an oscillation signal of oscillator 33 leaks to one input of mixer 17 or one input of mixer 25. This leaked oscillation signal and an oscillation signal that is properly input from oscillator 33 are self-mixed in mixer 17 or 25. This causes generation of DC offset voltage from mixer 17 or mixer 25.

Alternatively, if a large disturbing signal is input to input terminal 3, this disturbing signal leaks to one input of mixer 17 or one input of mixer 25. This leaked disturbing signal and the oscillation signal that is properly input from oscillator 33 are self-mixed in mixer 17 or 25. This causes generation of DC offset voltage from mixer 17 or mixer 25.

In this way, the first and second DC offset voltages are generated from mixers 17 and 25, respectively, degrading the reception quality.

Next, a method of improving these first and second DC offset voltages by DC offset control loop 106 is described.

DC offset control loop 106 includes DC offset detecting circuit 45, DC offset evaluation circuit 46, and DC offset correcting circuit 47. In DC offset detecting circuit 45, the first and second DC offset voltages are detected, respectively, using the I and Q signals output from A/D converters 37 and 39, respectively. This detection signal is input to DC offset evaluation circuit 46.

If the first and second DC offset voltages are less than an offset reference value in this DC offset evaluation circuit 46, DC offset correcting circuit 47 does not supply the first and second cancel signals. The same effect is also achievable when the first and second cancel signals are retained in compositors 19 and 27, respectively, instead of supplying the first second cancel signals from DC offset correcting circuit 47.

On the other hand, if the first and second DC offset voltages are greater than the offset reference value, DC offset correcting circuit 47 supplies the first and second cancel signals for canceling out the first and second DC offset voltages to compositors 19 and 27, respectively. This offset reference value can be input from external terminal 103a.

Compositors 19 and 27 combine the first and second DC offset voltages and the first and second cancel signals, respectively, so as to suppress the first and second DC offset voltages.

Memory (not illustrated) can be provided to DC offset evaluation circuit 46. This memory stores the offset reference value. DC offset evaluation circuit 46 can thus compare the detected first and second DC offset voltages with the offset reference value stored in memory.

Next, a method of supplying or stopping power to DC offset control loop 106 by driving circuit 111 is described.

Figure 5:
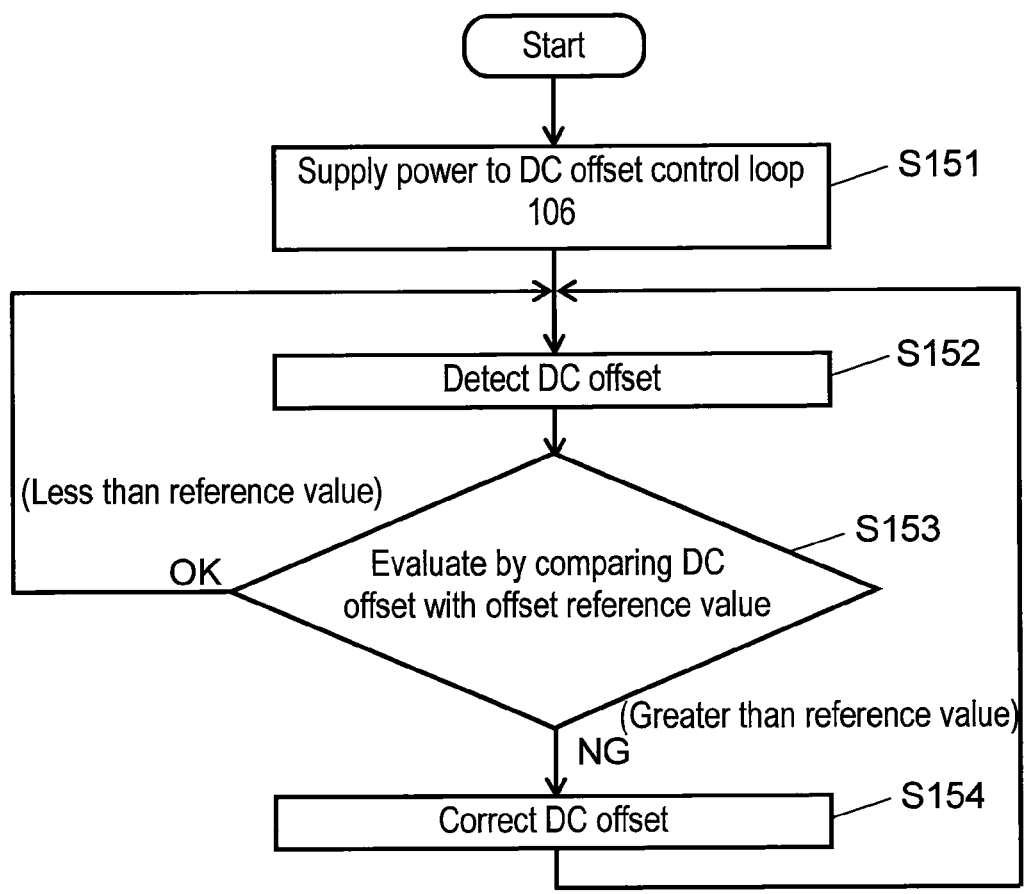
FIG. 5 is a flow chart illustrating a general DC offset voltage correction method for a high-frequency receiver.

FIG. 5 is a flow chart illustrating a general method of correcting DC offset voltage for a high-frequency receiver. In FIG. 5, power from driving circuit 111 is supplied to DC offset control loop 106 via power input terminal 106a at starting signal reception in reception step S151. Then, moving onto reception step S152, DC offset detecting circuit 45 detects the first and second DC offset voltages. Further moving onto reception step S153, DC offset evaluation circuit 46 evaluates the first and second DC offset voltages by comparison with the offset reference value.

Based on this detection result, the operation moves onto reception step S154 if the first and second DC offset voltages are greater than the offset reference value (Not Acceptable). DC offset correcting circuit 47 supplies the first and second cancel signals to first and second compositors 19 and 27 to correct the DC offset, and the operation further moves onto reception step S152.

On the other hand, if the first and second DC offset voltages are less than the offset reference value (OK), the operation returns to reception step S152 without making DC offset correction.

Compared to this general correction method, the next is described a method of correcting the first and second DC offset voltages in the second exemplary embodiment of the present invention.

Figure 6:
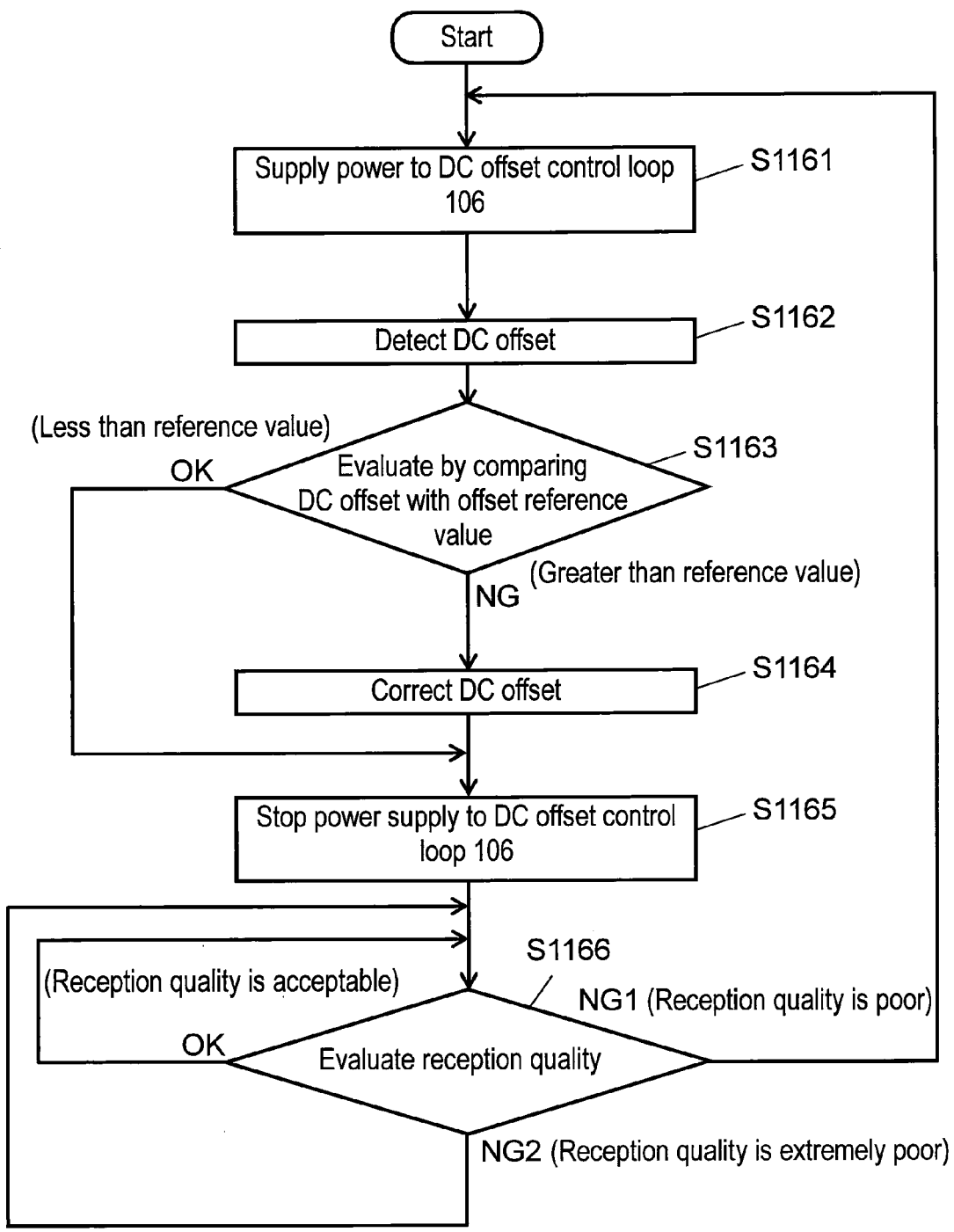
FIG. 6 is a flow chart illustrating a DC offset voltage correction method for the high-frequency receiver in accordance with the second exemplary embodiment of the present invention.

FIG. 6 is a flow chart illustrating a method of correcting the first and second DC offset voltages for the high-frequency receiver in the first exemplary embodiment of the present invention. In FIG. 6, power is supplied to DC offset control loop 106 in reception step S1161 at starting signal reception. Then, moving onto reception step S1162, DC offset detecting circuit 45 detects the first and second DC offset voltages. Then, moving onto reception step S1163, DC offset evaluation circuit 46 evaluates the first and second DC offset voltages by comparison with the offset reference value.

Based on this detection result, if the first and second DC offset voltages are greater than the offset reference value (Not Acceptable), the operation moves onto reception step S1164, and DC offset correcting circuit 47 executes DC offset correction. This DC offset correction using the first and second cancel signals can be retained in compositors 19 and 27, respectively. On the other hand, if the first and second DC offset voltages are less than the offset reference value (OK), DC offset correction is not executed, and the operation moves onto reception step S1165. In this reception step 1165, power supply from driving circuit 111 to DC offset control loop 106 is stopped.

Further moving onto Step S1166, reception quality evaluation circuit 109 evaluates the reception quality signal by comparison with the quality evaluation reference value. For example, BER is used as the reception quality signal. If this BER is less than the quality evaluation reference value, i.e., the reception quality is acceptable (OK), the operation returns to reception step S1166, and the reception quality is evaluated. On the other hand, if BER that is the reception quality signal is greater than the quality evaluation reference value, i.e., the reception quality is poor (Not Acceptable 1), the operation returns to reception step S1161, and the operation on and after reception step S1162 are repeated.

If BER that is the reception quality signal is extremely greater than the quality evaluation reference value, i.e., the reception quality is extremely poor (Not Acceptable 2), the operation returns to reception step S1166, and evaluation 166 of the reception quality is repeated.

As the reception quality signal, for example, C/N, bit error rate (BER), and packet error rate (PER) can be used. The reception quality is detectable in a shorter time by the use of C/N, BER, and PER, in that order, which means C/N enables the fastest detection of the reception quality. The reception quality is detectable in a longer time by the use of PER, BER, and C/N in that order, which means PER requires the longest time for detecting the reception quality. However, PER has the best accuracy for detecting the reception quality. Therefore, for example, for stopping power supply to DC offset control loop 106, PER that has the higher accuracy can be used for evaluating the reception quality. On the other hand, for supplying power and operating DC offset control loop 106, BER or C/N can be used to give priority to time spent for detecting the reception quality.

In this way, to supply power and operate DC offset control loop 106, it is necessary to secure sufficient reception quality. For example, if C/N is used, the detection accuracy is low but the reception quality is detectable in a short time. If PER is used, a longer time is required until detection, but its accuracy is high. Accordingly, if the reception quality of at least one of three PER, BER, and C/N is detected in reception quality detecting circuit 108, power is supplied to operate DC offset control loop 106. This minimizes degradation in the reception quality by delay in the operation of DC offset correction.

Power supply or shutoff to DC offset control loop 106 is thus accurately and optimally controlled, realizing high-frequency receiver 141 with low power consumption.

As described above, for receiving a desired channel by high-frequency receiver 141, power supply from driving circuit 111 to DC offset control loop 106 can be stopped when reception quality evaluation circuit 109 evaluates that the reception quality is acceptable. This enables shutoff of power supply to DC offset control loop 106, thus realizing the high-frequency receiver with low power consumption.

If the reception quality signal is better than the quality evaluation reference value, power supply from driving circuit 111 to DC offset control loop 106 is stopped. However, in this instance, power supply may be stopped to at least one of DC offset detecting circuit 45, DC offset evaluation circuit 46, and DC offset correcting circuit 47.

In the second exemplary embodiment, compositor 19 is inserted between mixer 17 and low pass filter 21, and compositor 27 is inserted between mixer 25 and low pass filter 29. However, this compositor 19 may be inserted between low pass filter 21 and output terminal 9, and compositor 27 may be inserted between low pass filter 29 and output terminal 11.

Moreover, for receiving ISDB-T digital television broadcast, 12 segments or 1 segment out of 13 segments, for example, can be received. During this 1-segment reception, correction of DC offset voltage is needed, as described in this exemplary embodiment. Contrarily, during 12-segment reception, 1 segment exists at the center position, and this 1 segment is not necessary. Therefore, an allowable value of DC offset voltage can be eased.

In other words, to ease allowance, the offset reference value for 12-segment reception can be made greater than the offset reference value for 1-segment reception in DC offset evaluation circuit 46. Alternatively, power supply can be stopped to at least one of DC offset detecting circuit 45, DC offset evaluation circuit 46, and DC offset correcting circuit 47 during 12-segment reception.

Furthermore, for 1-segment reception, the oscillation frequency of oscillator 33 is set not less than ½ (about 214 KHz) of 1-segment bandwidth (about 428.5 KHz) away from the center frequency of 1 segment. This enables transformation of intermediate frequency signal of 1 segment at not less than ½ of 1-segment bandwidth (about 214 KHz) away from a DC component by using mixing circuit 49 for heterodyne reception. In this case, a problem of DC offset does not occur.

Accordingly, power supply to DC offset control loop 106 can be stopped in case of 1-segment reception by mixing circuit 49. In this instance, power supply may be stopped to at least one of DC offset detecting circuit 45, DC offset evaluation circuit 46, and DC offset correcting circuit 47 that configure DC offset control loop 106.

To receive 1-segment and 12-segment transmissions separately, they are received as described above. To receive 13-segment transmission at once, power supply from driving circuit 111 to DC offset correcting circuit 47 can be controlled to shut off if the first and second DC offset voltages are less than the offset reference value.

Third Exemplary Embodiment

High-frequency receiver 201 in the third exemplary embodiment is described below with reference to drawings.

Figure 7:
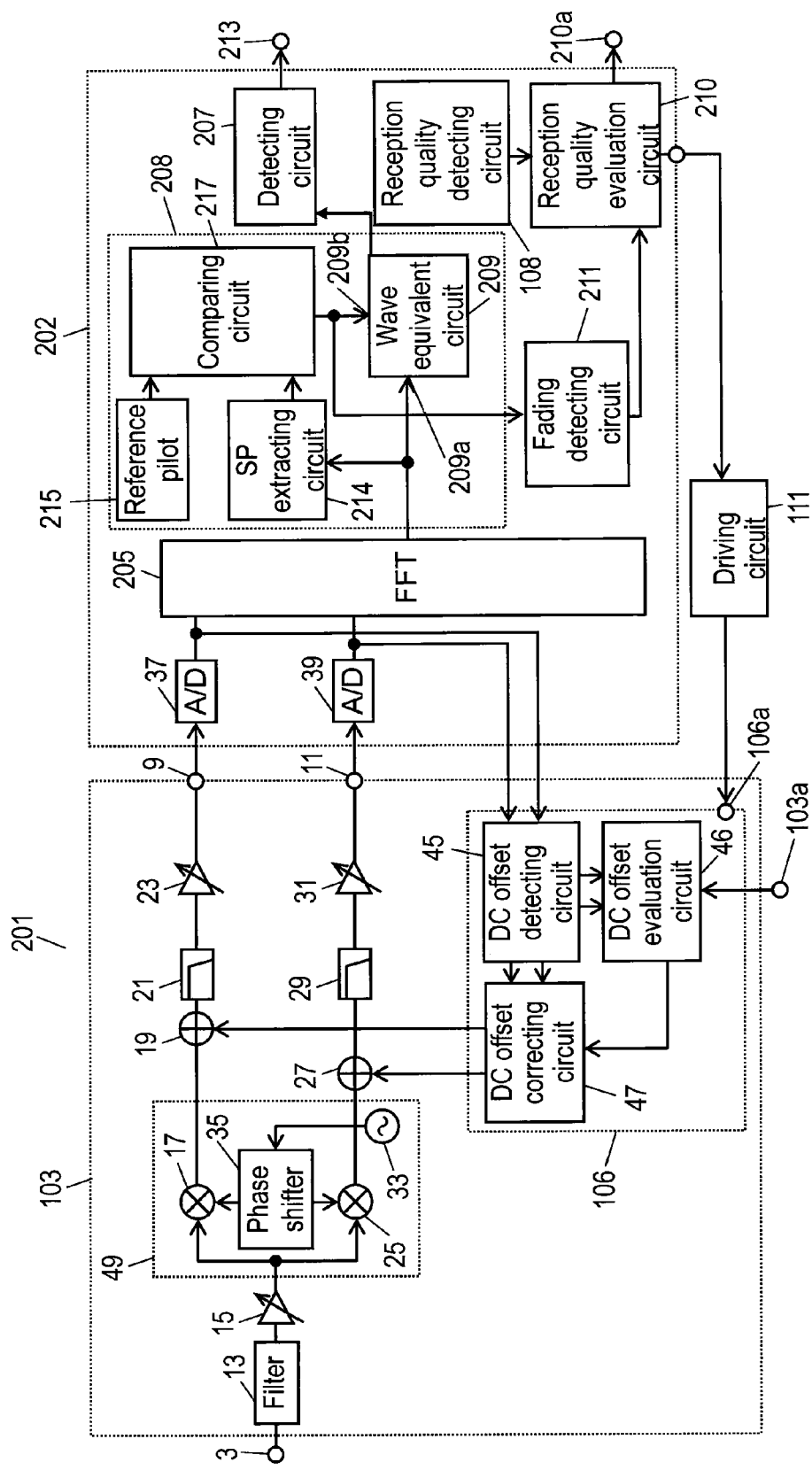
FIG. 7 is a circuit block diagram of a high-frequency receiver in accordance with a third exemplary embodiment of the present invention.

FIG. 7 is a circuit block diagram of high-frequency receiver 201 in the third exemplary embodiment of the present invention. Compared to high-frequency receiver 101 in the first exemplary embodiment, demodulator 202 in high-frequency receiver 201 in this exemplary embodiment includes waveform equivalent circuit unit 208 between Fast Fourier Transformer (FFT) 205 forming a demodulating circuit and detecting circuit 207, so as to correct signal degradation due to fading. In addition, fading detecting circuit 211 is connected between this waveform equivalent circuit unit 208 and reception quality evaluation circuit 210. These points are different. Compositors 19 and 27 may retain the first and second cancel signals, respectively, instead of continuously supplying cancel signals without changing values from DC offset correcting circuit 47 to compositors 19 and 27.

In FIG. 7, high-frequency receiver 201 includes electronic tuner 103 for receiving high-frequency signals from input terminal 3, demodulator 202 receiving I and Q signals output from this electronic tuner 103, and output terminal 213 outputting demodulated signals from this demodulator 202.

Demodulator 202 includes A/D converters 37 and 39 receiving the I and Q signals output from output terminals 9 and 11 of electronic tuner 103, respectively; FFT 205 receiving signals output from these A/D converters 37 and 39, respectively, for applying fast Fourier transform to the signals; waveform equivalent circuit 209 whose one input 209a is connected to an output of this FFT 205 for correcting signal degradation in a transmission channel, such as fading; detecting circuit 207 connected to an output of this waveform equivalent circuit 209 for detecting signals, output terminal 213 connected to an output of this detecting circuit 207, reception quality detecting circuit 108 for detecting the reception quality, and reception quality evaluation circuit 210 whose one input is connected to an output of this reception quality detecting circuit 108 for evaluating the reception quality.

This demodulator 202 further includes SP scattered pilot (SP) extracting circuit 214 connected to an output of FFT 205, comparing circuit 214 whose one input is connected to this SP extracting circuit 214, and reference pilot 215 connected to the other input of this comparing circuit 217. An output of this comparing circuit 217 is connected to the other input 209b of waveform equivalent circuit 209. Waveform equivalent circuit unit 208 is configured with SP extracting circuit 214, reference pilot 215, comparing circuit 217, and waveform equivalent circuit 209.

Furthermore, fading detecting circuit 211 is provided. This circuit 211 receives a waveform equivalent signal from waveform equivalent circuit 209, and detects the fading frequency. An output of this fading detecting circuit 211 is connected to the other input of reception quality evaluation circuit 210.

An output of this reception quality evaluation circuit 210 is input to driving circuit 111. An output of this driving circuit 111 is connected to power input terminal 106a of DC offset control loop 106.

In high-frequency receiver 201 as configured above, the fading frequency due to mobile reception is detected, and the quality of received signals is evaluated taking into account degradation in reception quality due to this fading frequency. Then, power supply to DC offset control loop 106 is controlled based on this evaluation signal on the reception quality. The operation is described below.

Digital signals input to this high-frequency receiver 201 are OFDM modulated signals. For example, in ISDB-T mode 3, which is digital broadcast in Japan, one channel is made up of 5617 subcarriers. This OFDM modulated signal applies phase modulation (QPSK), amplitude phase modulation (QAM), or amplitude modulation (BPSK) to 5617 subcarriers. Therefore, spectral composition can be observed by using FFT signal processing to this OFDM modulated signal. FFT 205 thus outputs the spectral composition.

Next is described the operation of waveform equivalent circuit unit 208.

Figure 8A:
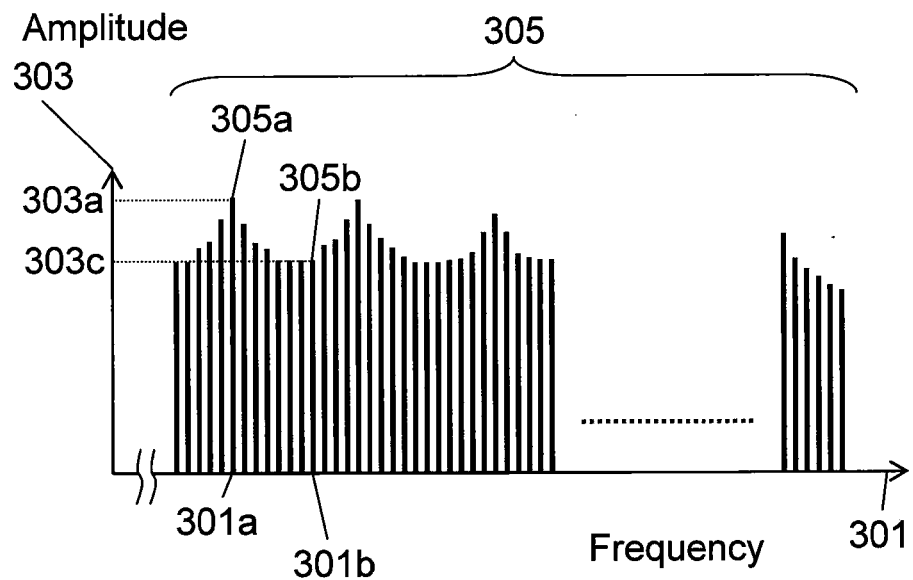
FIG. 8A illustrates spectral composition of an input signal at one moment in the high-frequency receiver in accordance with the third exemplary embodiment of the present invention.
Figure 8B:
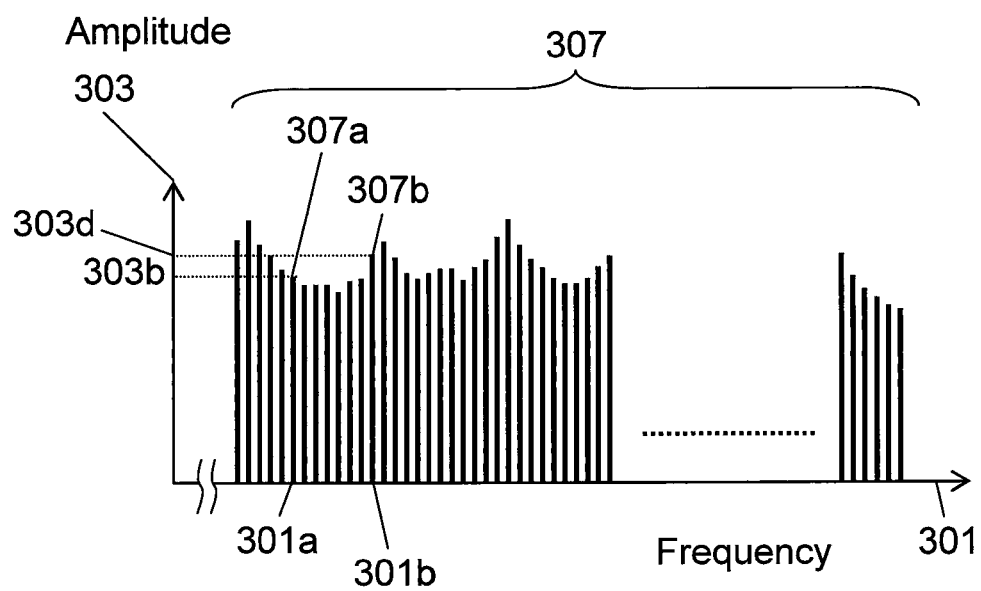
FIG. 8B illustrates spectral composition of an input signal at another moment in the high-frequency receiver in accordance with the third exemplary embodiment of the present invention.

FIG. 8A is spectral composition input from input terminal 3 at one moment to in the high-frequency receiver in the third exemplary embodiment of the present invention. FIG. 8B is spectral composition input from input terminal 3 at another moment tb in the high-frequency receiver in the third exemplary embodiment of the present invention. Frequency 301 is on a horizontal axis, and amplitude 303 is on a vertical axis.

Amplitude 303a of subcarrier 305a at frequency 301a in FIG. 8A is different from amplitude 303b of subcarrier 307a at the same frequency 301a in FIG. 8B. This is because fading is generated by the movement of high-frequency receiver 201, and thus amplitude of subcarrier has changed. This is the same for subcarriers other than subcarriers 305a and 307a.

Figure 9:
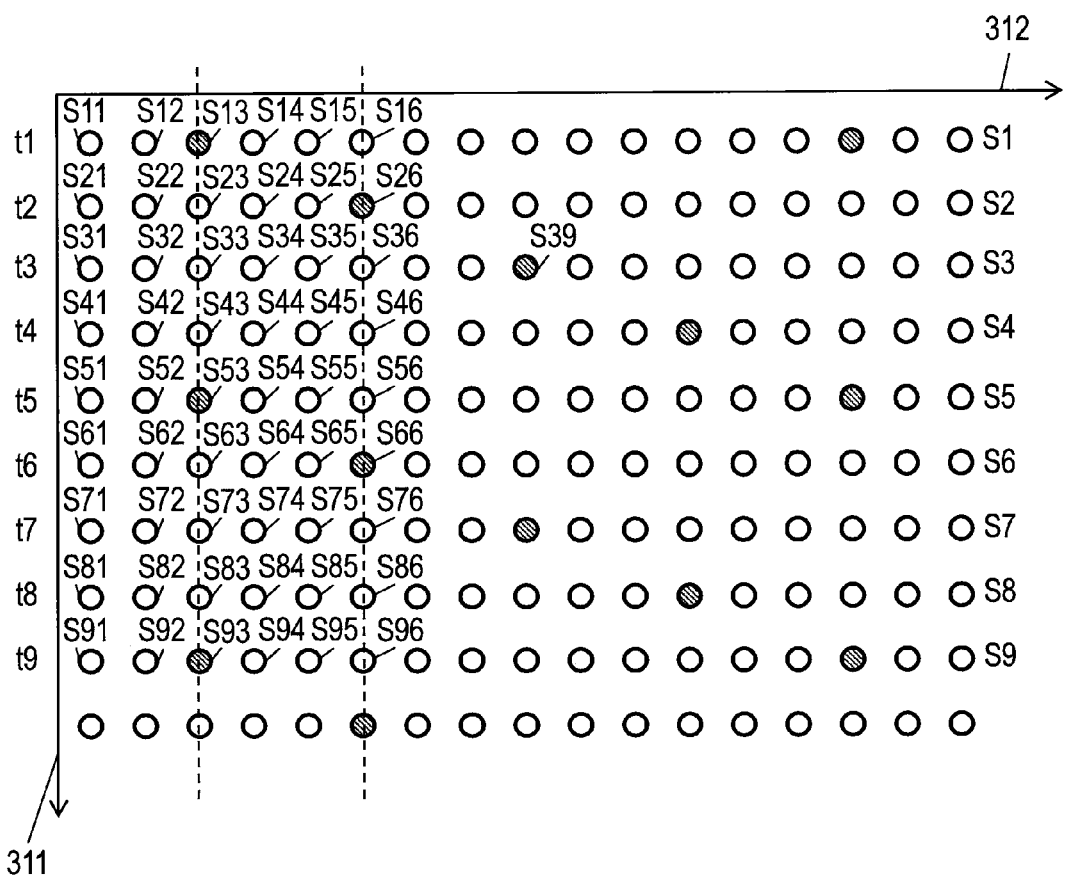
FIG. 9 illustrates configuration of symbols output from FFT of the high-frequency receiver in accordance with the third exemplary embodiment of the present invention.

FIG. 9 is symbol composition against time 311 output from FFT 205 of high-frequency receiver in the third exemplary embodiment of the present invention. In FIG. 9, this FFT 205 applies fast Fourier transformation to each modulated signal, which is the input signal, and outputs symbol composition S1, S2, S3, and so on corresponding to time t1, t2, t3, and so on.

Symbol composition S1 at time t1 includes each data symbol S11, S12, S13, and so on in the direction of frequency 312. In the same way, symbol composition S2 at time t2 includes each data symbol S21, S22, S23, and so on in the direction of frequency. Symbol compositions S3, S4, S5, and so on at time t3, t4, t5, and so on are also the same.

In these symbol compositions S1, S2, S,3, and so on, one SP signal is inserted after 11 data symbols. For example if data symbol S13 is SP signal, data symbol S26 is SP signal, and data symbol S39 is also SP signal.

In this way, the SP signal is sent in accordance with a predetermined rule in the symbol composition. This SP signal enables phase and amplitude correction ct the receiver side by estimating a transmission channel in OFDM transmission.

SP extracting circuit 214 can extract this SP signal. More specifically, comparing circuit 217 can output a waveform equivalent signal by comparing an amplitude level of SP signal with a reference signal from reference pilot 215. By the use of this waveform equivalent signal, waveform equivalent circuit 209 can correct signal degradation with respect to phase and amplitude of subcarrier due to fading.

Next is described the operation of detecting the fading frequency by fading detecting circuit 211, to which the waveform equivalent signal is input, with reference to FIG. 9. The waveform equivalent signal is input to fading detecting circuit 211.

In FIG. 9, data symbol S13 at time t1, carrier No. S53 at time t5, and carrier No. S93 at time t9 all have the same frequency as waveform equivalent signals. Accordingly, fading detecting circuit 211 can detect the fading frequency by sequentially comparing a change in amplitude or phase in data symbols S13, S53, S93, and so on.

Figure 10:
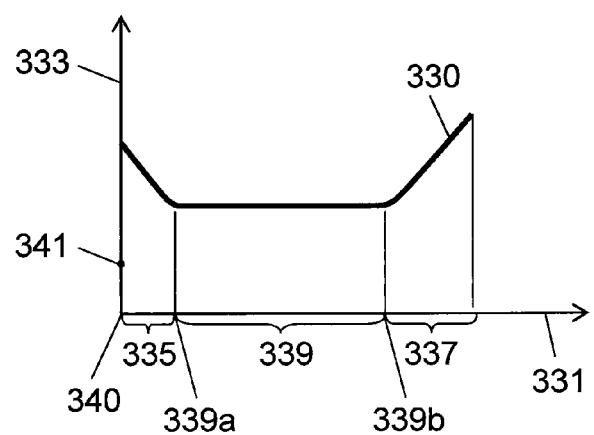
FIG. 10 is a chart illustrating C/N characteristic against fading frequency of the high-frequency receiver in accordance with the third exemplary embodiment of the present invention.

FIG. 10 shows C/N characteristics against fading frequency of the high-frequency receiver in the third exemplary embodiment. In FIG. 10, required C/N differs depending on the fading frequency. Accordingly, the quality evaluation reference value used for evaluation in reception quality evaluation circuit 210 needs to be changed.

Next, the operation of changing the quality evaluation reference value in reception quality evaluation circuit 210 corresponding to this fading frequency is described.

This required C/N characteristic 330 is C/N 333 when a bit error rate of a Viterbi-decoded signal after detection corresponding to fading frequency 331 (or movement speed) is 0.0002. Required C/N characteristic 330 becomes greater at low fading frequencies in low-speed movement area 335 (slow movement speed) and at high fading frequencies in high-speed movement area 337 (high movement speed). On the other hand, in medium-speed movement area 339 (medium movement speed) whose fading frequencies are intermediate, it is known that required C/N is smaller than that for low-speed movement area 335 and high-speed movement area 337.

For example, required C/N at fading frequency 339a ranging from about 20 Hz (equivalent to about 45 km in movement speed at receiving 13 channel) to fading frequency 339b of about 60 Hz (equivalent to about 140 km/H in movement speed at receiving 13 channel) in medium-speed movement area 339 is, for example, stable 6 dB. Contrarily, in low-speed movement area 335 of less than fading frequency 339a, required C/N increases as the movement speed becomes slower. In high-speed movement area 337 of fading frequency 339b or higher, required C/N increases as the movement becomes faster. In addition, required C/N 341 in still state 340 is, for example, 4 dB because of no fading.

As described above, since required C/N differs by fading frequency, C/N, which is the quality evaluation reference value in reception quality evaluating circuit 210, can be set for each fading frequency. This reception quality evaluation circuit 210 can evaluate the reception quality based on C/N set depending on fading frequency. Accordingly, if there is no degradation in the reception quality, based on this evaluation, power supply can be stopped from driving circuit 111 to DC offset control loop 106.

Figure 11:
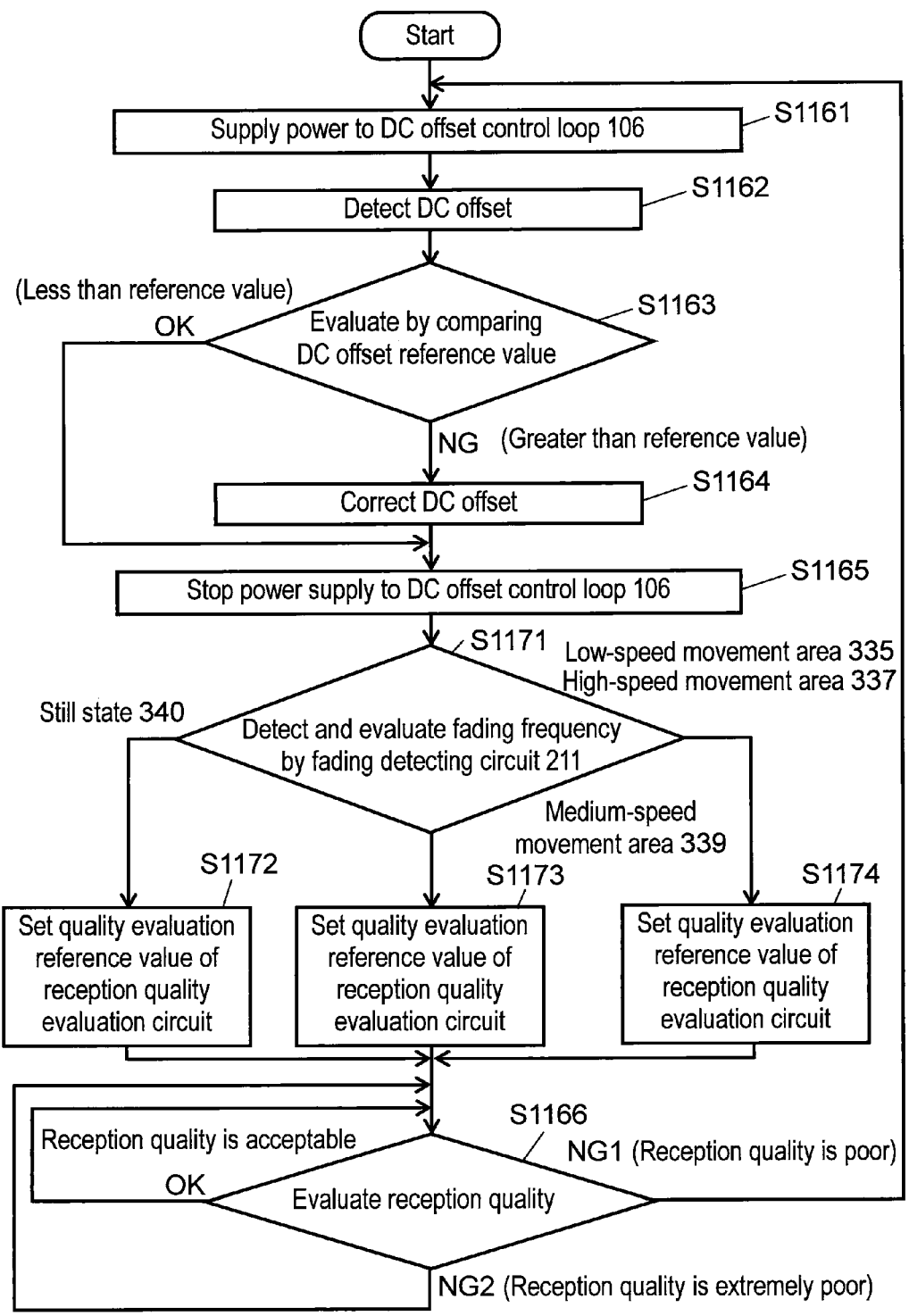
FIG. 11 is a flow chart illustrating a DC offset voltage correction method of the high-frequency receiver in accordance with the third exemplary embodiment of the present invention.

FIG. 11 is a flow chart illustrating a method of correcting the first and second DC offset voltages in the high-frequency receiver in the third exemplary embodiment of the present invention. In FIG. 11, reception step S1161 to reception step S1165 and reception step S1166 are the same as the reception steps in the second exemplary embodiment. In the third exemplary embodiment, reception steps S1171 to S1174 are added between reception steps S1165 and S1166 in the second exemplary embodiment.

After reception step S1165, the operation moves onto reception step S1171. In this reception step S1171, fading detecting circuit 211 detects the fading frequency. Still more, this fading detecting circuit 211 determines still state 340, low-speed movement area 335, medium speed movement area 339, or high speed movement area 337 based on the fading frequency.

Based on this determination result, the operation moves onto reception step S1172 in cased of still state 340, and the smallest quality evaluation reference value is set. In case of medium-speed movement area 339 based on the determination result, the operation moves onto reception step S1173, and a small quality evaluation reference value is set. In case of low-speed movement area 335 or high-speed movement area 337 based on the determination result, the operation moves onto reception step S1174, and a large quality evaluation reference value is set. This quality evaluation reference value can be input from external terminal 210a, and thus the value can be optimally set from outside, depending on the reception state.

Then, in step S1166, reception quality evaluation circuit 210 evaluates the reception quality signal by comparison with the quality evaluation reference value. For example, if BER is used as the reception quality signal, and this BER is less than the quality evaluation reference value, i.e., the reception quality is acceptable (OK), the operation returns to reception step S1166 to evaluate the reception quality. On the other hand, if BER that is the reception quality signal is greater than the quality evaluation reference value, i.e., the reception quality is poor (Not Acceptable 1), the operation returns to reception step S1161, and on and after reception steps S1162 are repeated.

If BER that is the reception quality signal is extremely greater than the quality evaluation reference value, i.e., the reception quality is extremely poor (Not Acceptable 2), the operation returns to S1166 for evaluation 1166 of the reception quality.

As the reception quality signal, for example, C/N, BER (bit error rate), and PER (packet error rate) can be used. By the use of these reception quality signals, the reception quality is detectable in a shorter time by the use of C/N, BER, and PER, in that order, which means C/N enables the fastest detection of the reception quality. The reception quality is detectable in a longer time by the use of PER, BER, and C/N in that order, which means PER requires the longest time for detecting the reception quality. However, PER has the best accuracy for detecting the reception quality.

Therefore, to supply power and operate DC offset control loop 106, BER or C/N can be used to give priority to time spent for detecting the reception quality.

To supply power and operate DC offset control loop 106, it is necessary to secure sufficient reception quality. For example, if C/N is used, the detection accuracy is low but the reception quality is detectable in a short time. If PER is used, a longer time is required until detection, but its accuracy is high. Accordingly, if the reception quality of at least one of three PER, BER, and C/N is detected in reception quality detecting circuit 108, power is supplied to operate DC offset control loop 106. This minimizes degradation in the reception quality by delay in the operation of DC offset correction.

Power supply or shutoff to DC offset control loop 106 is thus accurately and optimally controlled, realizing high-frequency receiver 201 with low power consumption.

If the reception quality signal is better than the quality evaluation reference value, power supply from driving circuit 111 to DC offset control loop 106 is stopped. However, in this instance, power supply may be stopped to at least one of DC offset detecting circuit 45, DC offset evaluation circuit 46, and DC offset correcting circuit 47.

As described above, fading detecting circuit 211 optimizes the quality evaluation reference value, depending on the fading frequency, and reception quality evaluation circuit 210 evaluates the reception quality based on this quality evaluation reference value. As a result, if the reception quality is acceptable, power supply from driving circuit 111 to DC offset control loop 106 is stopped. Accordingly, high-frequency receiver 201 with low power consumption can be achieved.

Fourth Exemplary Embodiment

High-frequency receiver 401 in the fourth exemplary embodiment of the present invention is described next with reference to drawings.

Figure 12:
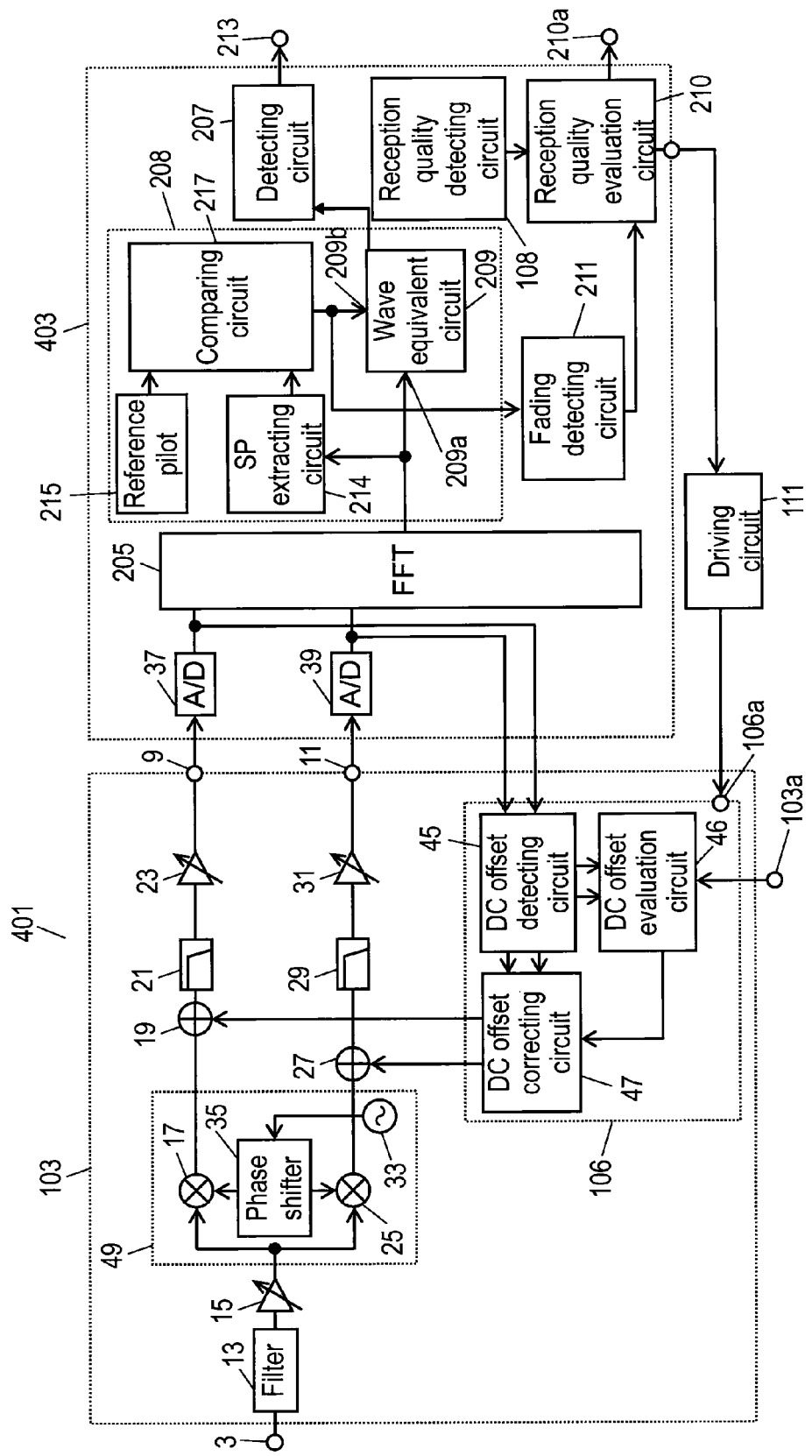
FIG. 12 is a circuit block diagram of a high-frequency receiver in accordance with a fourth exemplary embodiment of the present invention.

FIG. 12 is a circuit block diagram of the high-frequency receiver in the fourth exemplary embodiment. In demodulator 403 of high-frequency receiver 401 in the fourth exemplary embodiment, as shown in FIG. 12, fading detecting circuit 405 is connected between FFT 205 and reception quality evaluation circuit 210, while fading detecting circuit 211 is connected between waveform equivalent circuit 209 and reception quality evaluation circuit 109 in high-frequency receiver 201 in the third exemplary embodiment. This point is different.

Accordingly, the operation of high-frequency receiver 401 in the fourth exemplary embodiment has the operation and effect same as high-frequency receiver 201 in the third exemplary embodiment except for fading detecting circuit 405. Same components as those in FIG. 8 are given the same reference marks in FIG. 13 to simplify description.

High-frequency receiver 401 includes electronic tuner 103 for receiving high-frequency signals from input terminal 3, demodulator 403 receiving I and Q signals output from this electronic tuner 103, and output terminal 213 outputting demodulated signals from this demodulator 403.

In demodulator 403, fading detecting circuit 405 is provided. This circuit receives an output signal of FFT 205, and detects fading frequency. An output of this fading detecting circuit 405 is connected to the other input of reception quality evaluation circuit 210.

The operation of fading detecting circuit 405 of high-frequency receiver 401 as configured above is described next.

Figure 13A:
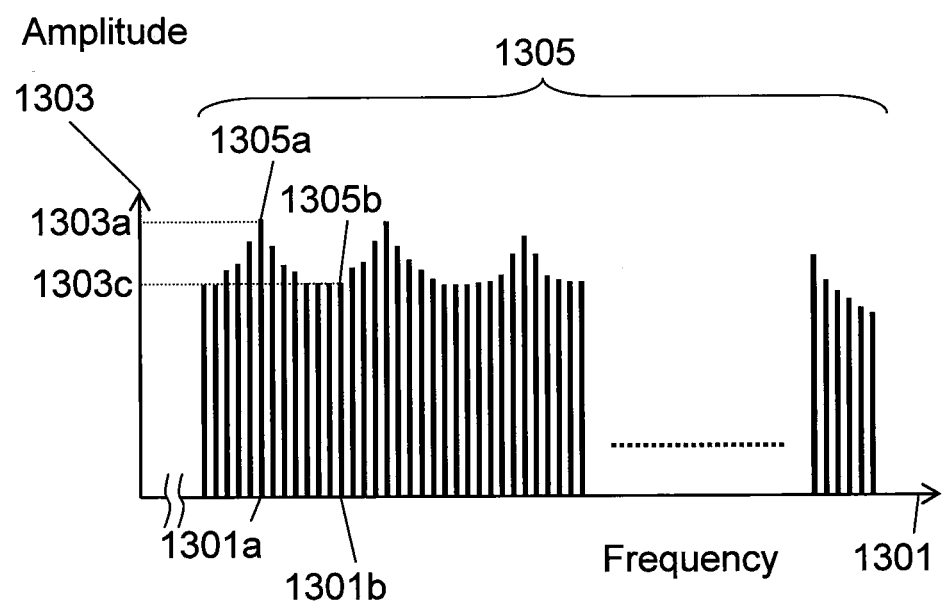
FIG. 13A illustrates spectral composition of an input signal at one moment in the high-frequency receiver in accordance with the fourth exemplary embodiment of the present invention.
Figure 13B:
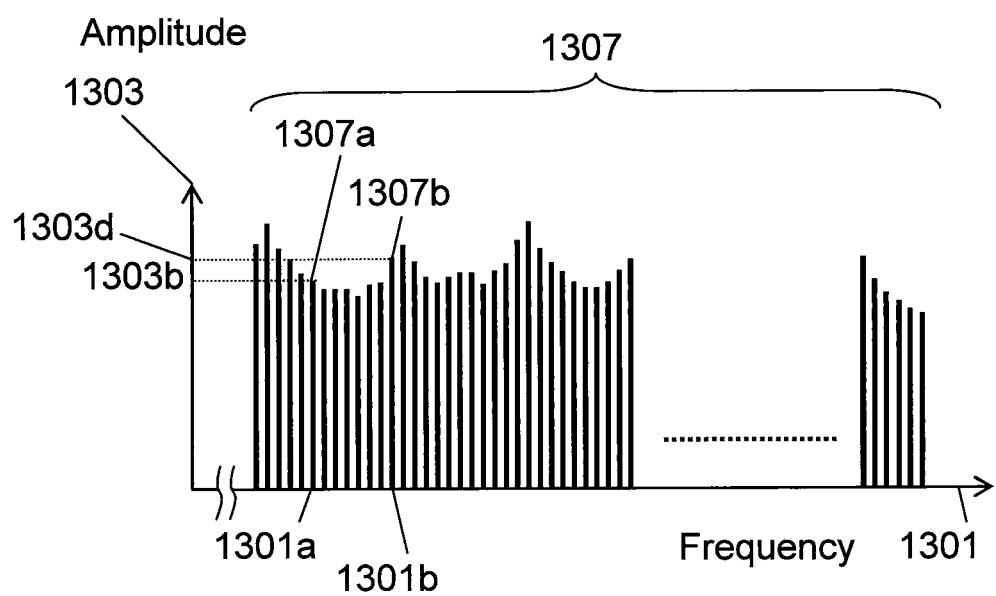
FIG. 13B illustrates spectral composition of an input signal at another moment in the high-frequency receiver in accordance with the fourth exemplary embodiment of the present invention.

FIG. 13A shows spectral composition of an input signal at one moment of the high-frequency receiver in the fourth exemplary embodiment of the present invention. FIG. 13B is spectral composition of an input signal at another moment of the high-frequency receiver in the fourth exemplary embodiment of the present invention. In FIGS. 13A and 13B, an output signal from FFT 205, which is input to fading detecting circuit 405, is expressed by the spectral composition. As shown in the drawings, the spectral composition at one moment to changes to the spectral composition at next one moment tb from moment to moment. A method of detecting fading frequency using this change is described next.

For example, at frequency 1301a, amplitude 1303a of subcarrier 1305a changes to smaller amplitude 1303b of subcarrier 1308a. At frequency 1301b, amplitude 1303c of subcarrier 1305b changes to larger amplitude 1303d of subcarrier 1307b.

Accordingly, the fading frequency can be detected by a difference in changing directions of amplitudes by time between at least two subcarriers. By increasing the number of subcarriers to be compared, the fading frequency can be more accurately detected.

As described above, fading detecting circuit 405 detects the fading frequency, and the quality evaluation reference value is changed corresponding to this fading frequency. Reception quality evaluation circuit 210 evaluates the reception quality based on this changed quality evaluation reference value. Power is supplied or stopped to DC offset control loop 106 based on this evaluation signal. Accordingly, the reception quality can be accurately evaluated even during movement, and power supply to DC offset control loop 106 is stopped if power is not necessary based on this evaluation result. A high-frequency receiver that allows low power consumption can thus be achieved.

In the fourth exemplary embodiment, the fading frequency is detected by detecting a change in amplitude of subcarrier. However, the fading frequency can also be detected by using C/N (carrier/noise) of subcarrier.

Fifth Exemplary Embodiment

Figure 14:
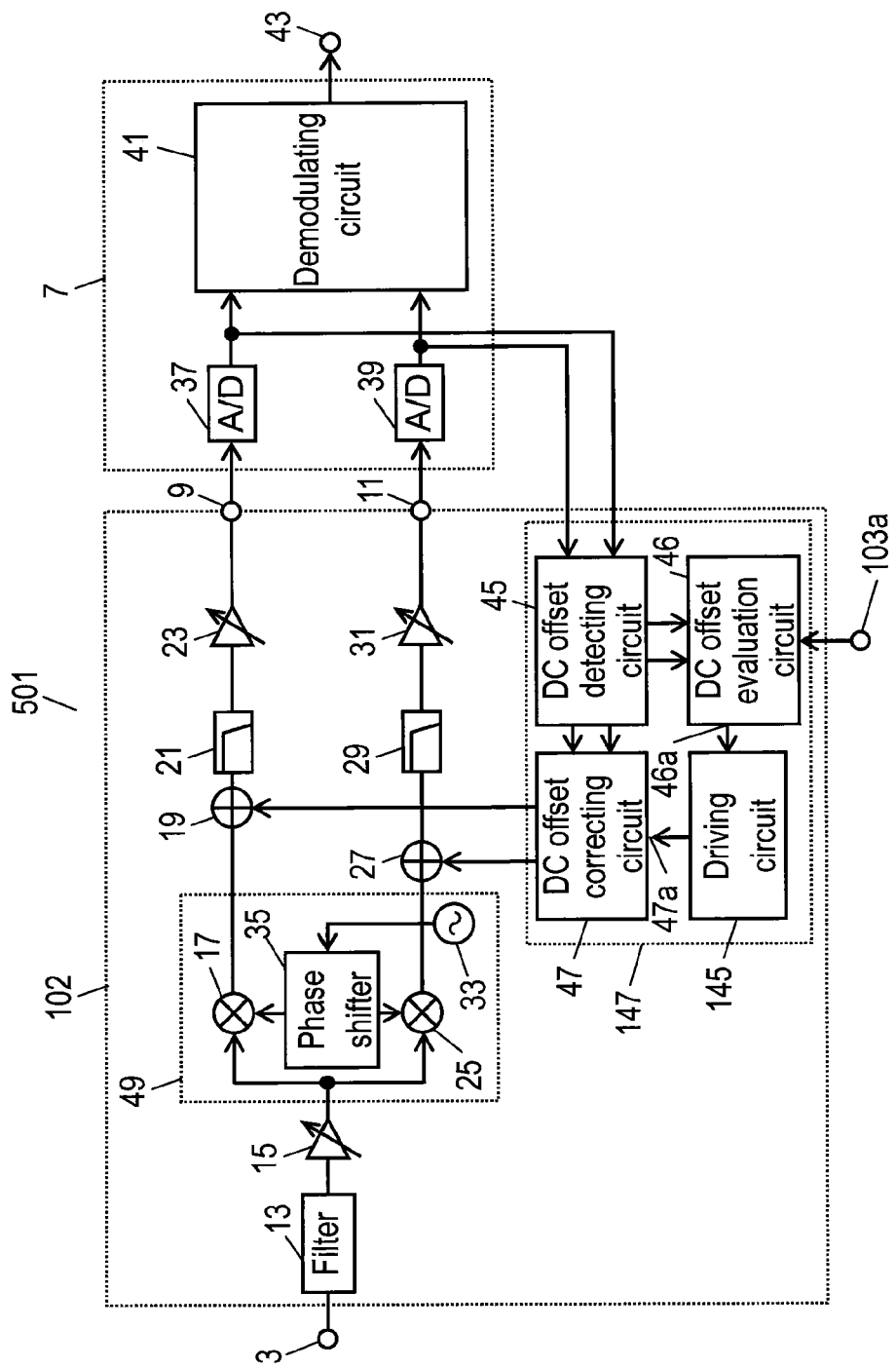
FIG. 14 is a circuit block diagram of a high-frequency receiver in accordance with a fifth exemplary embodiment of the present invention.

A high-frequency receiver in the fifth exemplary embodiment is described below with reference to drawings. FIG. 14 is a circuit block diagram of high-frequency receiver 501 in the fifth exemplary embodiment of the present invention. In FIG. 14, same reference marks are given to components same as those in the prior art shown in FIG. 4 to simplify their description. Compared to electronic tuner 5 in the prior art, driving circuit 145 is connected between output 46a of DC offset evaluation circuit 46 and input 47a of DC offset correcting circuit 47 in electronic tuner 102 in the fifth exemplary embodiment. This point is different.

DC offset control loop 147 is configured with these DC offset detecting circuit 45, DC offset evaluation circuit 46, driving circuit 145, and DC offset correcting circuit 47.

The operation of high-frequency receiver 501 as configured above is described below. Electronic tuner 102 receives a high-frequency signal input from an antenna. Demodulator 7 demodulates a signal selected by this electronic tuner 102, and outputs this signal from output terminal 43. This high-frequency signal is, for example, digitally-modulated digital television broadcast, and frequencies ranging from about 470 MHz (CH13) to about 770 MHz (CH62) can be used in UHF.

Next, the operation of electronic tuner 102 is described. Filter 13 suppresses a disturbing signal in the high-frequency signal input to input terminal 3. Amplifier 15 applies gain control to an output of this filter 13. An output of this amplifier 15 is fed to mixing circuit 49.

Mixing circuit 49 is configured as a direct conversion system mixer including mixers 17 and 25, oscillator 33, and 90-degree phase shifter 35. Through this mixing circuit 49, I and Q signals with 90-degree different phases to each other are output from mixers 17 and 25. These I and Q signals are input to low pass filters 21 and 29. Outputs of these low pass filters 21 and 29 are input to amplifiers 23 and 31. These amplifiers 23 and 31 output the I and Q signals via output terminals 9 and 11, respectively. These I and Q signals are input to demodulator 7. A/D converters 37 and 39 are provided in this demodulator 7, and convert these signals to digital signals. Demodulating circuit 41 converts these signals to demodulated signals, and they are output from output terminal 43.

In mixing circuit 49 adopting the above-described direct conversion system, an oscillation signal of oscillator 33 leaks to one input of mixer 17 or one input of mixer 25. This leaked oscillation signal and an oscillation signal that is properly input from oscillator 33 are self-mixed in mixer 17 or 25. This causes generation of DC offset voltage from mixer 17 or mixer 25.

Alternatively, if a large disturbing signal is input to input terminal 3, this disturbing signal leaks to one input of mixer 17 or one input of mixer 25. This leaked disturbing signal and the oscillation signal that is properly input from oscillator 33 are self-mixed in mixer 17 or 25. This causes generation of DC offset voltage from mixer 17 or mixer 25.

In this way, first and second DC offset voltages are generated from mixers 17 and 25, respectively, degrading the reception quality.

A method of improving these first and second DC offset voltages by DC offset control loop 147 is described next. This DC offset control loop 147 is configured with DC offset detecting circuit 45, DC offset evaluation circuit 46, driving circuit 145, and DC offset correcting circuit 47.

This DC offset detecting circuit 45 detects the first and second DC offset voltages from the I and Q signals output from A/D converters 37 and 39, respectively, and supplies these voltages to DC offset evaluation circuit 46. This DC offset evaluation circuit 46 evaluates the detected first and second DC offset voltages by comparison with a reference value. This reference value can be input from external terminal 103a.

If the detected first and second DC offset voltages are greater than the reference value, driving circuit 145 supplies power to DC offset correcting circuit 47 based on an evaluation signal received from DC offset evaluation circuit 46. Then, DC offset correcting circuit 47 supplies the first and second cancel signals for canceling out the first and second DC offset voltages detected by DC offset detecting circuit 45 to compositors 19 and 27, respectively. By feeding the first and second cancel signals to these compositors 19 and 27, respectively, the first and second DC offset voltages and the first and second cancel signals are combined in compositors 19 and 27, respectively, so as to suppress the first and second DC offset voltages.

If the detected first and second DC offset voltages are less than the reference value, driving circuit 145 stops power supply to DC offset correcting circuit 47 based on an evaluation signal received from DC offset evaluation circuit 46. However, although power supply to DC offset correcting circuit 47 is stopped, the first and second cancel signals for canceling out the first and second DC offset voltages is supplied to the other inputs of compositors 19 and 27. The same effect is also achievable by retaining the first and second cancel signals in compositors 19 and 27, respectively, instead of supplying the first and second cancel signals.

Memory 104 (not illustrated) can be provided to DC offset evaluation circuit 46. This memory 104 stores the reference value. Accordingly, DC offset evaluation circuit 46 can compare the detected first and second DC offset voltages with the reference value stored in memory 104.

Figure 15:
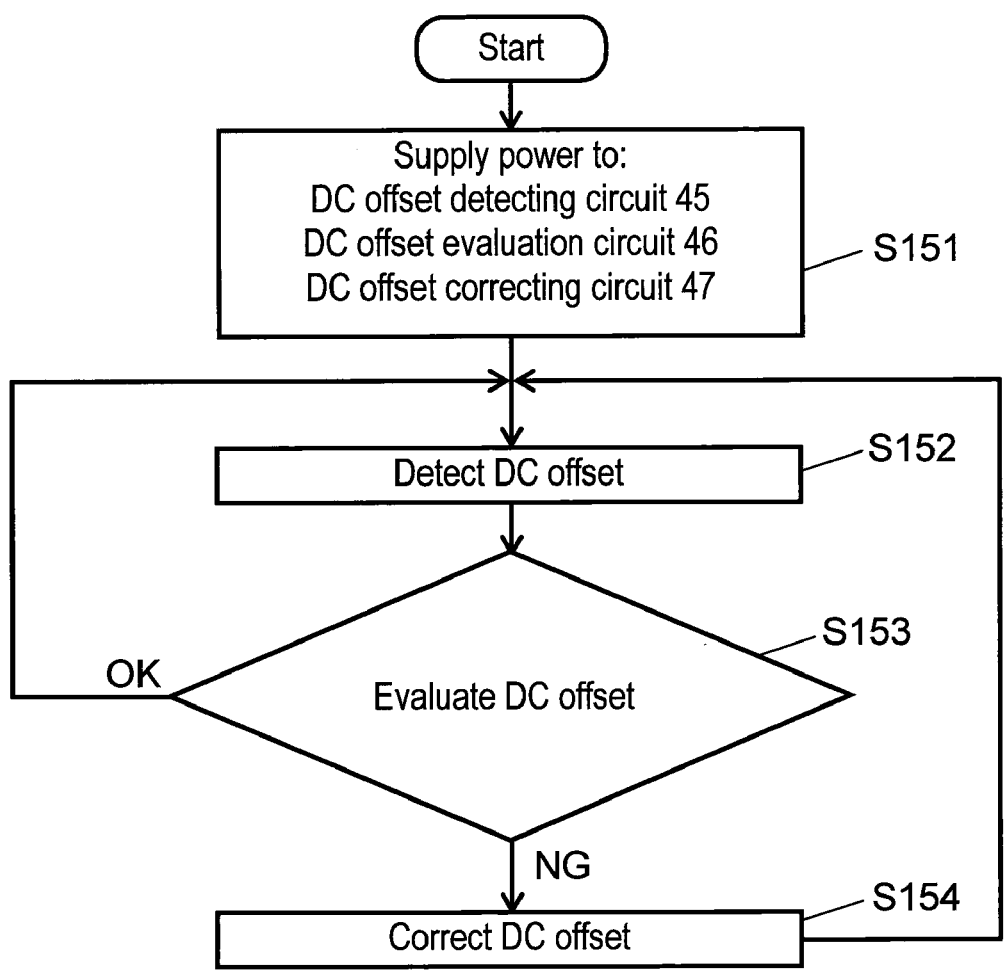
FIG. 15 is a flow chart illustrating a general DC offset voltage correction method.

FIG. 15 is a flow chart illustrating a general method of correcting DC offset voltage in a high-frequency receiver. In FIG. 15, power is supplied to DC offset detecting circuit 45, DC offset evaluation circuit 46, and DC offset correcting circuit 47 at starting signal reception in reception step S151. Then, moving onto reception step S152, DC offset detecting circuit 45 detects the first and second DC offset voltages. Further moving onto reception step S153, DC offset evaluation circuit 46 evaluates the first and second DC offset voltages by comparison with the reference value.

Based on this detection result, if the first and second DC offset voltages are greater than the reference value (Not Acceptable), the operation moves onto reception step S154. DC offset correcting circuit 47 applies DC offset correction, and then the operation further moves onto reception step S152. On the other hand, if the first and second DC offset voltages are less than the reference value (OK), the operation returns to reception step S152.

In contrast, a method of correcting the first and second DC offset voltages in the fifth exemplary embodiment of the present invention is described below.

Figure 16:
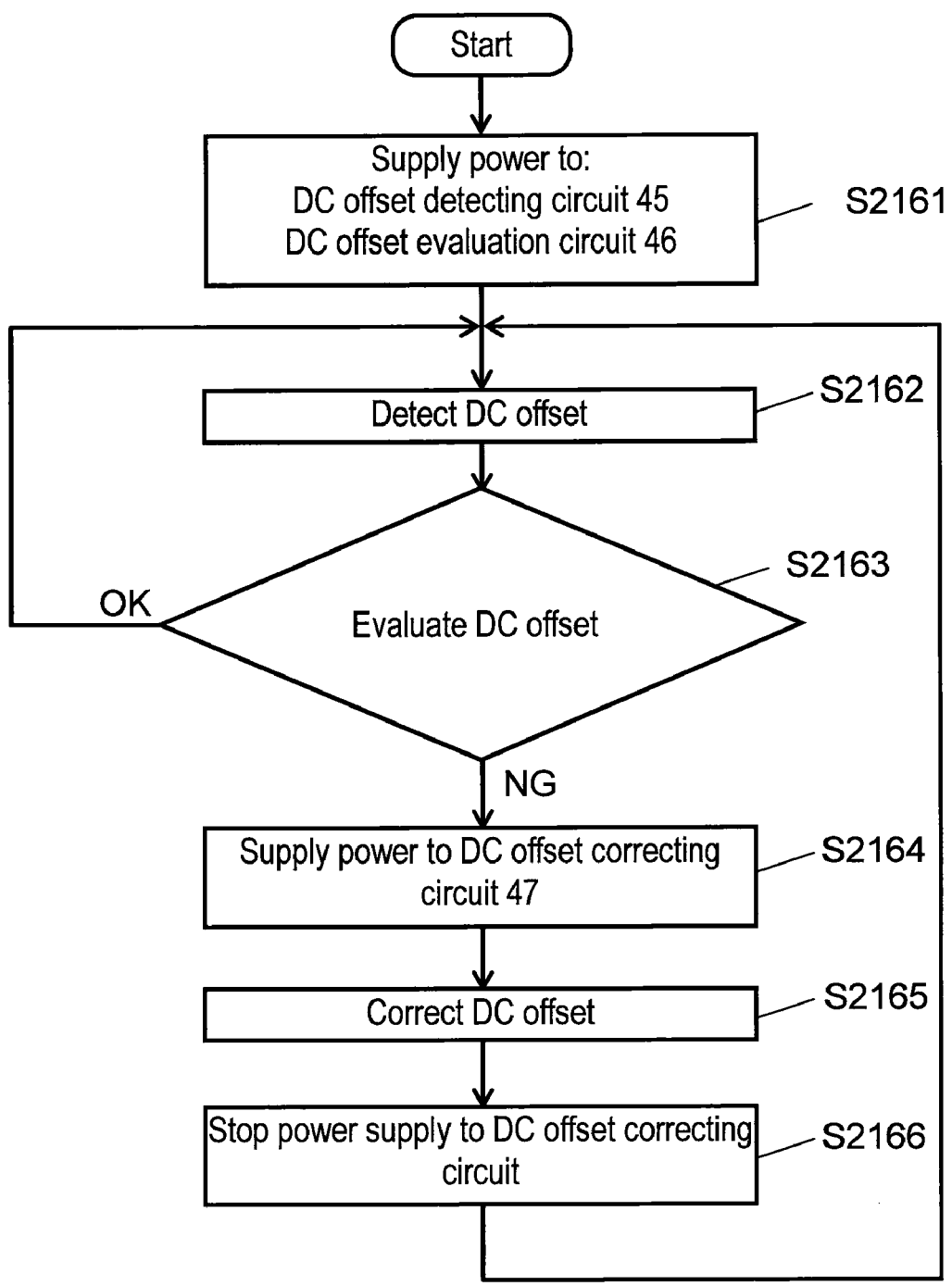
FIG. 16 is a flow chart illustrating a DC offset voltage correction method for the high-frequency receiver in accordance with the fifth exemplary embodiment of the present invention.

FIG. 16 is a flow chart illustrating the method of correcting the first and second DC offset voltages in the high-frequency receiver in the fifth exemplary embodiment of the present invention. In FIG. 16, power is supplied to DC offset detecting circuit 45 and DC offset evaluation circuit 46 at starting signal reception in reception step S2161. Then, moving onto reception step S2162, DC offset detecting circuit 45 detects the first and second DC offset voltages. Further moving onto reception step S2163, DC offset evaluation circuit 46 evaluates the first and second DC offset voltages by comparison with the reference value.

In this detection result, if the first and second DC offset voltages are less than the reference value (OK), the operation returns to reception step S2162. On the other hand, if the first and second DC offset voltages are greater than the reference value (Not Acceptable), the operation moves onto reception step S2164, and power is supplied from driving circuit 145 to DC offset correcting circuit 47.

Then, the operation moves onto reception step S2165, and DC offset correcting circuit 47 corrects the first and second DC offset voltages. Then, moving onto step S2166, power supplied from driving circuit 145 to DC offset correcting circuit 47 is stopped. The operation then returns to reception step S2162.

As described above, the first and second DC offset voltages are generated in mixers 17 and 25 in mixing circuit 49 adopting the direction conversion system. DC offset detecting circuit 45 detects these first and second DC offset voltages based on output signals from A/D converters 37 and 39.

These detected first and second DC offset voltages are input to DC offset evaluation circuit 46 to evaluate them by comparison with the reference value. If these detected first and second DC offset voltages are less than the reference value, DC offset evaluation circuit 46 supplies a control signal to driving circuit 145. Based on this control signal, driving circuit 145 stops supplying power to DC offset correcting circuit 47.

As described above, driving circuit 145 is provided between DC offset evaluation circuit 46 and DC offset correcting circuit 47. If the first and second DC offset voltages are small, driving circuit 145 stops supplying power to DC offset correcting circuit 47. Accordingly, electronic tuner 102 with low power consumption can be achieved.

In the fifth exemplary embodiment, compositor 19 is inserted between mixer 17 and low-pass filter 21, and compositor 27 is inserted between mixer 25 and low pass filter 29. However, this compositor 19 may be inserted between low pass filter 21 and output terminal 9, and compositor 27 between low pass filter 29 and output terminal 11.

Moreover, for receiving ISDB-T digital television broadcast, 12 segments or 1 segment out of 13 segments, for example, can be received. During this 1-segment reception, correction of DC offset voltage is needed, as described in the exemplary embodiment. Contrarily, during 12-segment reception, 1 segment exists at the center position, and this 1 segment is not necessary. Therefore, an allowable value of DC offset voltage can be eased.

In other words, to ease allowance, the reference value for 12-segment reception can be made greater than the reference value for 1-segment reception in DC offset evaluation circuit 46. Alternatively, power supply can be stopped to at least one of DC offset detecting circuit 45, DC offset evaluation circuit 46, and DC offset correcting circuit 47 during 12-segment reception.

Furthermore, for 1-segment reception, the oscillation frequency of oscillator 33 is set not less than ½ (about 214 KHz) of 1-segment bandwidth (about 428.5 KHz) away from the center frequency of 1 segment. This enables transformation of intermediate frequency signal of 1 segment at not less than ½ of 1-segment bandwidth (about 214 KHz) away from a DC component by using mixing circuit 49 for heterodyne reception. In this case, a problem of DC offset does not occur.

Accordingly, power supply to DC offset control loop 106 can be stopped in case of 1-segment reception by mixing circuit 49. In this instance, power supply may be stopped to at least one of DC offset detecting circuit 45, DC offset evaluation circuit 46, and DC offset correcting circuit 47 that configure DC offset control loop 106.

To receive 1-segment and 12-segment transmissions separately, they are received as described above. To receive 13-segment transmission at once, power supply from driving circuit 145 to DC offset correcting circuit 47 can be controlled to shut off if the first and second DC offset voltages are less than the reference value.

INDUSTRIAL APPLICABILITY

A high-frequency receiver of the present invention is effectively applicable to devices that require low power consumption, such as mobile televisions.

The invention claimed is:
1. A high-frequency receiver comprising:
an electronic tuner for receiving a digital broadcast signal;
a demodulator for demodulating an output signal from the electronic tuner; and
a driving circuit;
the electronic tuner comprising:
an input terminal to which the digital broadcast signal is input;
first and second mixers adopting a direct conversion system to which the digital broadcast signal is supplied to their one inputs and an oscillation signal of an oscillator is supplied to their other inputs via a phase shifter, the first and second mixers outputting output signals with different phases to each other;
first and second output terminals to which outputs of the first and second mixers are supplied, respectively;

a DC offset control loop for detecting first and second DC offset voltages in the output signals of the first and second mixers, the DC offset control loop outputting first and second cancel signals for canceling out the first and second DC offset voltage, respectively;

a first compositor connected between the first mixer and the first output terminal, the first cancel signal being input to the first compositor; and a second compositor connected between the second mixer and the second output terminal, the second cancel signal being input to the second compositor; and the demodulator comprising:

a demodulating circuit connected between an output of the electronic tuner and an output terminal of the high frequency receiver, the demodulating circuit including, a reception quality detecting circuit for detecting a quality of a received signal; and a reception quality evaluation circuit for evaluating a detected signal output from the reception quality detecting circuit by comparison with a first reference value, and outputting an evaluation signal to the driving circuit;

wherein power supply to the DC offset control loop is stopped by the driving circuit when the reception quality evaluation circuit evaluates that the quality of the received signal is acceptable.

2. The high-frequency receiver of claim 1,
wherein
the DC offset control loop comprises:
a DC offset detecting circuit to which signals output from the first and second mixers are supplied, the DC offset detecting circuit detecting the first and second DC offset voltages, respectively;
a DC offset evaluation circuit for evaluating the first and second DC offset voltages output from the DC offset detecting circuit by comparison with a second reference value; and
a DC offset correcting circuit for outputting first and second cancel signals so as to cancel out the first and second DC offset voltages, respectively, based on evaluation by the DC offset evaluation circuit.

3. The high-frequency receiver of claim 2,
wherein
when the driving circuit stops power supply to the DC offset control loop, power supply is stopped to at least one of the DC offset detecting circuit, the DC offset evaluation circuit, and the DC offset correcting circuit that configure the DC offset control loop.

4. The high-frequency receiver of claim 2,
wherein a packet error rate is used as a reception quality signal to the reception quality evaluation circuit when power supply is stopped to at least one of the DC offset detecting circuit, the DC offset evaluation circuit, and the DC offset correcting circuit.

5. The high-frequency receiver of claim 2,
wherein the second reference value for 12-segment reception is greater than the second reference value for 1-segment reception when the DC offset evaluation circuit evaluates the received signal.

6. The high-frequency receiver of claim 2,
wherein,
during 1-segment reception in the digital broadcast signal, power is supplied to the DC offset detecting circuit, the DC offset evaluation circuit, and the DC offset correcting circuit; and during 12-segment reception in the digital broadcast signal, power supply is stopped to at least one of the DC offset detecting circuit, the DC offset evaluation circuit, and the DC offset correcting circuit.

7. The high-frequency receiver of claim 2,
wherein,
during 1-segment reception in the digital broadcast signal, the first and second mixers adopts a heterodyne system by setting a frequency of the oscillator to not less than ½ of a bandwidth of the 1 segment away from a center frequency of the 1 segment, and
power supply is stopped to at least one of the DC offset detecting circuit, the DC offset evaluation circuit, and the DC offset correcting circuit.

8. The high-frequency receiver of claim 1,
wherein
an external terminal for inputting the first reference value is provided to the reception quality evaluation circuit.

9. The high-frequency receiver of claim 1,
wherein one of a bit error rate and C/N is used as the first reference value in the reception quality evaluation circuit.

10. The high-frequency receiver of claim 1,
wherein a packet error rate is used as the first reference value in the reception quality evaluation circuit.

11. The high-frequency receiver of claim 1,
wherein at least one of packet error rate, bit error rate, and C/N is used as a reception quality signal to the reception quality evaluation circuit when power is supplied to the DC offset control loop.

12. The high-frequency receiver of claim 1,
wherein the demodulator further comprises
an analog to digital (A/D) converter connected between the output of the electronic tuner and an input of the demodulating circuit, wherein an output of the A/D converter is connected to the DC offset control loop.

13. A high-frequency receiver comprising:
an electronic tuner for receiving a digital broadcast signal;
a demodulator for demodulating an output signal from the electronic tuner; and
a driving circuit;
the electronic tuner comprising:
an input terminal to which the digital broadcast signal is input;
first and second mixers adopting a direct conversion system to which the digital broadcast signal is supplied to their one inputs and an oscillation signal of an oscillator is supplied to their other inputs via a phase shifter, the first and second mixers outputting output signals with different phases to each other;
first and second output terminals to which outputs of the first and second mixers are supplied;
a DC offset control loop for detecting first and second DC offset voltages in the output signals of the first and second mixers, the DC offset control loop outputting first and second cancel signals for canceling out the first and second DC offset voltage, respectively;
a first compositor connected between the first mixer and the first output terminal, the first cancel signal being input to the first compositor; and
a second compositor connected between the second mixer and the second output terminal, the second cancel signal being input to the second compositor; and the demodulator comprising:
  a demodulating circuit connected between an output of the electronic tuner and an output terminal of the high frequency receiver, the demodulating circuit including,
    a reception quality detecting circuit for detecting a quality of a received signal;
    a first fading detecting circuit for detecting a fading frequency due to movement; and
    a reception quality evaluation circuit to which a reception quality signal from the reception quality detecting circuit and the fading frequency from the first fading detecting circuit are input, and outputting an evaluation signal to the driving circuit;
  wherein,
  a quality evaluation reference value in the reception quality evaluation circuit is set depending on the fading frequency from the first fading detecting circuit, and power supply to the DC offset control loop by the driving circuit is stopped when the reception quality evaluation circuit evaluates that the quality of the received signal is acceptable.

14. The high-frequency receiver of claim 13, the demodulator comprising:
  an A/D converter for converting an analog signal input from the input terminal to a digital signal;
  a fast Fourier transformer for applying fast Fourier transformation to an input signal;
  a waveform equivalent circuit for returning a signal waveform to that of a source signal;
  an SP extracting circuit connected to a detecting circuit for detecting a signal, the SP extracting circuit receiving an output of the fast Fourier transformer and extracting a scattered pilot signal; and
  a comparing circuit to which an SP signal from the SP extracting circuit is connected to its one input, and a reference pilot signal is connected to its other input;
  wherein
  a waveform equivalent signal obtained by comparing the SP signal output from the comparing circuit with the reference pilot signal is connected to an other input of the waveform equivalent circuit; and
  the waveform equivalent signal is input to the first fading detecting circuit.

15. The high-frequency receiver of claim 14,
  wherein
  a second fading detecting circuit is provided, instead of the first fading detecting circuit, the second fading detecting circuit receiving an output signal of the fast Fourier transformer and detecting the fading frequency by a change in amplitude by time of at least two subcarriers; and
  an output signal of the fast Fourier transformer, instead of the waveform equivalent signal input to the waveform equivalent circuit, is input to the second fading detecting circuit.

16. The high-frequency receiver of claim 15,
  wherein
  a third fading detecting circuit, instead of the second fading detecting circuit, is provided, the third fading detecting circuit receiving an output signal of the fast Fourier transformer and detecting the fading frequency by a change in C/N by time of at least two subcarriers.

17. The high-frequency receiver of claim 13, the DC offset control loop comprising:
  a DC offset detecting circuit to which signals output from the first and the second mixers are supplied, the DC offset detecting circuit detecting the first and the second DC offset voltages;
  a DC offset evaluation circuit for evaluating the first and the second DC offset voltages by comparison with an offset reference value; and
  a DC offset correcting circuit for outputting the first and the second cancel signals so as to cancel out the first and the second DC offset voltages based on evaluation by the DC offset evaluation circuit.

18. The high-frequency receiver of claim 17,
  wherein
  when the driving circuit stops power supply to the DC offset control loop,
  power supply is stopped to at least one of the DC offset detecting circuit, the DC offset determining circuit, and the DC offset correcting circuit that configure the DC offset control loop.

19. The high-frequency receiver of claim 17,
  wherein a packet error rate is used as the reception quality signal to the reception quality evaluation circuit when power supply is stopped to at least one of the DC offset detecting circuit, the DC offset evaluation circuit, and the DC offset correcting circuit is stopped.

20. The high-frequency receiver of claim 13,
  wherein an external terminal for inputting the quality evaluation reference value is provided to the reception quality evaluation circuit.

21. The high-frequency receiver of claim 13,
  wherein at least one of a packet error rate, a bit error rate, and C/N is used as the reception quality signal to the reception quality evaluation circuit when power is supplied to the DC offset control loop.

22. An electronic tuner comprising:
  an input terminal;
  first and second mixers adopting a direct conversion system to which a digital broadcast signal from the input terminal is supplied to their one inputs, and an oscillation signal of a local oscillator is supplied to their other inputs via a phase shifter, the first and the second mixers outputting output signals with difference phases to each other;
  first and second output terminals to which outputs of the first and second mixers are supplied, respectively;
  a DC offset detecting circuit to which output signals of the first and the second mixers are supplied, the DC offset detecting circuit detecting a DC offset voltage;
  a DC offset evaluation circuit for evaluating a first and a second DC offset voltages output from the DC offset detecting circuit by comparison with a reference value;
  a DC offset correcting circuit for outputting first and second cancel signals for canceling out the first and the second DC offset voltages, respectively, based on evaluation by the DC offset evaluation circuit;
  a first compositor connected between the first mixer and the first output terminal, the first cancel signal being input to the first compositor;
  a second compositor connected between the second mixer and the second output terminal, the second cancel signal being input to the second compositor; and
  a driving circuit to which a first evaluation signal output from the DC offset evaluation circuit is input;

wherein
a first driving voltage output from the driving circuit is connected to the DC offset correcting circuit;
power supply to the DC offset correcting circuit is stopped by the driving circuit when the first and second DC offset voltages are less than the reference value in the DC offset evaluation circuit;
a first external terminal for inputting the reference value is provided to the DC offset evaluation circuit; and
the reference value is set greater than a reference value for 1-segment reception during 12-segment reception in the digital broadcast signal.

23. The electronic tuner of claim 22,
wherein during 1-segment reception in the digital broadcast signal, power is supplied to the DC offset detecting circuit, the DC offset evaluation circuit, and the DC offset correcting circuit; and
during 12-segment reception in the digital broadcast signal, power supply is stopped to at least one of the DC offset detecting circuit, the DC offset evaluation circuit, and the DC offset correcting circuit.

24. The electronic tuner of claim 22,
wherein during 1-segment reception in the digital broadcast signal, the first and the second mixers adopt a heterodyne system by setting a frequency of the local oscillator to not less that ½ of a bandwidth of the 1 segment away from a center frequency of the 1 segment, and power supply is stopped to at least one of the DC offset detecting circuit, the DC offset evaluation circuit, and the DC offset correcting circuit.

25. A high-frequency receiver, in which the first and the second output terminals of the electronic tuner of claim 22 are connected to a demodulator, the demodulator comprising:
first and second A/D converters to which signals from the first and the second output terminals are supplied, the first and the second A/D converters converting an analog signal to a digital signal;
wherein
signals output from the first and second A/D converters are connected to the DC offset detecting circuit, respectively.

26. A high-frequency receiver comprising:
an electronic tuner for receiving a digital broadcast signal;
a demodulator for demodulating an output signal from the electronic tuner; and
a driving circuit;
the electronic tuner comprising:
an input terminal to which the digital broadcast signal is input;
first and second mixers adopting a direct conversion system to which the digital broadcast signal is supplied to their one inputs and an oscillation signal of an oscillator is supplied to their other inputs via a phase shifter, the first and second mixers outputting output signals with different phases to each other;
first and second output terminals to which outputs of the first and second mixers are supplied, respectively;
a DC offset control loop for detecting first and second DC offset voltages in the output signals of the first and second mixers, the DC offset control loop outputting first and second cancel signals for canceling out the first and second DC offset voltage, respectively;
a first compositor connected between the first mixer and the first output terminal, the first cancel signal being input to the first compositor; and
a second compositor connected between the second mixer and the second output terminal, the second cancel signal being input to the second compositor; and
the demodulator comprising:
a reception quality detecting circuit for detecting a quality of a received signal including at least one of a bit error rate, carrier/noise (C/N), and a packet error rate; and
a reception quality evaluation circuit for evaluating a detected signal output from the reception quality detecting circuit by comparison with a first reference value, and outputting an evaluation signal to the driving circuit;
wherein
power supply to the DC offset control loop is stopped by the driving circuit when the reception quality evaluation circuit evaluates that the quality of the received signal is acceptable.

* * * * *